United States Patent
Billaud

(10) Patent No.: US 11,049,403 B2
(45) Date of Patent: Jun. 29, 2021

(54) METHOD FOR MEASURING, IN LINE OPERATION, CERTAIN CHARACTERISTICS OF THE ONBOARD TRANSPONDER BY USING THE SECONDARY RADAR

(71) Applicant: THALES, Courbevoie (FR)

(72) Inventor: Philippe Billaud, Limours (FR)

(73) Assignee: THALES, Courbevoie (FR)

( * ) Notice: Subject to any disclaimer, the term of this patent is extended or adjusted under 35 U.S.C. 154(b) by 237 days.

(21) Appl. No.: 16/412,315

(22) Filed: May 14, 2019

(65) Prior Publication Data

US 2019/0355260 A1 Nov. 21, 2019

(30) Foreign Application Priority Data

May 17, 2018 (FR) ...................................... 1800479

(51) Int. Cl.
| | | |
|---|---|---|
| *G08G 5/00* | (2006.01) | |
| *G01S 3/02* | (2006.01) | |
| *G01S 13/91* | (2006.01) | |
| *G01S 13/933* | (2020.01) | |

(52) U.S. Cl.
CPC ............ *G08G 5/0008* (2013.01); *G01S 3/023* (2013.01); *G01S 13/91* (2013.01); *G01S 13/933* (2020.01); *G08G 5/0078* (2013.01); *G01S 2013/916* (2013.01)

(58) Field of Classification Search
USPC .................................................... 342/29–42
See application file for complete search history.

(56) References Cited

U.S. PATENT DOCUMENTS

| | | | | |
|---|---|---|---|---|
| 4,027,307 A | * | 5/1977 | Litchford | G01S 13/781 342/32 |
| 4,376,937 A | * | 3/1983 | Cohen | H01Q 25/02 342/43 |
| 4,823,272 A | * | 4/1989 | Inselberg | G01S 7/22 701/120 |
| 4,839,658 A | * | 6/1989 | Kathol | G08G 5/0013 342/455 |
| 4,947,350 A | * | 8/1990 | Murray | G06F 30/18 702/181 |

(Continued)

FOREIGN PATENT DOCUMENTS

| | | |
|---|---|---|
| EP | 2 431 762 A1 | 3/2012 |
| WO | 2016/163925 A1 | 10/2016 |

*Primary Examiner* — Bhavesh V Amin
(74) *Attorney, Agent, or Firm* — BakerHostetler

(57) ABSTRACT

A test method in operational phase includes three distinct steps, a first step using the replies of the transponder to the interrogations in the Mode S transmitted in operational mode by the secondary radar to perform the measurement of the power of the transponder, and the measurement of the average rate of reply to the interrogations in Mode S transmitted by the radar intended for it; a second step which performs the measurement of the sensitivity of the transponder and a third step which carries out the test of its maximum rate of reply. The second step and the third step are carried out by modifying the operating parameters of the radar so that the additional interrogations required for the measurement can be performed, during the time interval following the last operational interrogation during which the aircraft remains located within the main Sum channel lobe of the antenna of the radar.

12 Claims, 10 Drawing Sheets

(56) References Cited

U.S. PATENT DOCUMENTS

| | | | | |
|---|---|---|---|---|
| 5,058,024 A * | 10/1991 | Inselberg | ............ | G08G 5/0082 |
| | | | | 701/301 |
| 5,157,615 A * | 10/1992 | Brodegard | ............. | G01S 13/74 |
| | | | | 701/301 |
| 6,313,783 B1 * | 11/2001 | Kuntman | ............. | G01S 13/933 |
| | | | | 342/32 |
| 7,598,905 B2 * | 10/2009 | Stayton | ................ | G01S 7/4004 |
| | | | | 342/165 |
| 8,674,872 B2 * | 3/2014 | Billaud | ................... | G01S 7/034 |
| | | | | 342/39 |
| 8,700,306 B2 * | 4/2014 | Duggan | ................ | G05D 1/106 |
| | | | | 701/301 |
| 2008/0238758 A1 * | 10/2008 | Billaud | ................ | G01S 13/782 |
| | | | | 342/32 |
| 2011/0090053 A1 * | 4/2011 | Soula | .................... | H01Q 25/02 |
| | | | | 340/10.1 |
| 2019/0355260 A1 * | 11/2019 | Billaud | ................ | G01S 13/933 |
| 2021/0033721 A1 * | 2/2021 | Billaud | ................ | G01S 13/767 |

* cited by examiner

METHOD FOR MEASURING, IN LINE OPERATION, CERTAIN CHARACTERISTICS OF THE ONBOARD TRANSPONDER BY USING THE SECONDARY RADAR

CROSS-REFERENCE TO RELATED APPLICATIONS

This application claims priority to foreign French patent application No. FR 1800479, filed on May 17, 2018, the disclosure of which is incorporated by reference in its entirety.

FIELD OF THE INVENTION

The invention relates to the general field of Air Traffic Control (ATC), for which the performance of the control radar on the ground, and that of the transponders onboard aircrafts, are fundamental for guaranteeing the requisite high level of safety.

It relates more particularly to monitoring the performance levels of an onboard transponder operating in Mode S (selective mode), by means of the control radar with which it dialogues.

BACKGROUND

Nowadays, air traffic control is mainly based on dialogue in mode S between one or more radars associated with a control centre on the ground and the mode S transponders of aircrafts in flight for which it ensures the surveillance and safety. The detection and decoding reliability of the air traffic control systems operating in Mode S is recognized all over the world.

However, the performance levels of the Mode S links are in practice directly linked to the performance characteristics of the transponders placed onboard the aircraft, which dialogue in Mode S with the traffic control radar.

In effect, a traffic control radar of secondary radar type, contrary to a primary surveillance radar, which does not expect any cooperation from the objects moving around in space that it surveys, is distinguished by the fact that it establishes, with each aircraft for which it ensures the surveillance, a dialogue based, in Mode S, on:

a selective interrogation, on a frequency of 1030 MHz, intended specifically for the aircraft concerned, via the Mode S address thereof, the reply from the transponder of the aircraft concerned to that interrogation, on a frequency of 1090 MHz, encoded with its Mode S address.

The good quality of this dialogue involves, at the transponder level, three main characteristics:

the power of its transmitter which is a second factor determining the distance beyond which the aircraft is no longer under the control of the radar concerned;

its capacity to process numerous Mode S replies (supported load): local average, global average and maximum rate of reply;

the sensitivity of its receiver, and the capacity for decoding the Mode S interrogation received, sensitivity which is a prime factor determining the distance beyond which the aircraft is no longer under control of the radar concerned.

It should also be noted that, while a secondary radar transmits its Mode S interrogations directionally to a particular aircraft moving around in the space that it controls, the transponder of an aircraft transmits and receives omnidirectionally and can therefore dialogue with all the radars which surround it. This multiple dialogue can generate and excessive load at the transponder level.

It should also be noted that a transponder also transmits unsolicited (asynchronous) messages, other than the replies to the interrogations that it is the subject of and which put to contribution its capacity to formulate and transmit the many Mode S replies to the Mode S interrogations that it is subjected to.

Although the dialogue capacity and the performance levels of a transponder are physically limited, they must however observe the minimum requirements defined by the regulations of the International Civil Aviation Organization (ICAO), minima which make it possible to guarantee a given minimum level of integrity of the radar-transponder links.

To this end, a Mode S transponder must in particular exhibit:

a peak radiated transmission power, within a power interval given by the ICAO;

a minimum rate of reply in Mode S, which is particularly design-critical;

a minimum sensitivity and a minimum dynamic range;

antenna patterns, in transmission and in reception, that exhibit given masks, directly participating in the radiation.

Currently, it is not possible to simply check the operating characteristics of a transponder, since it is installed onboard an aircraft.

Indeed, the checking methods that are used require the transponder to be removed and placed on a test bench which means that the aircraft must be kept on the ground during the checking phases and that high downtime costs are incurred.

Consequently, in the current technical context, the measurements that make it possible to know the fundamental characteristics of a transponder, namely:

the measurement of its transmission power at 1090 MHz which makes it possible to determine its ability to transmit replies to the radar interrogations, the measurement of its rate of generation of replies following interrogation (local, global and maximum average rate);

the measurement of its sensitivity in reception at 1030 MHz which makes it possible to determine its ability to receive the interrogations transmitted by a control radar, can be performed only during the periods of maintenance of the aircraft on which it is installed, which require keeping the aircraft on the ground.

There is no simple and economically affordable means currently available which makes it possible to detect, between two maintenance periods, a malfunctioning or a lowering in the performance of a transponder.

However, for obvious safety reasons, it is necessary to detect, as early as possible, the degradations of the performance levels of a transponder, particularly if these degradations are such that the transponder no longer meets certain requirements set out by the ICAO authorities, in particular those mentioned in annex 10—volume IV of the convention on International Civil Aviation. In fact, such degradations of the performance levels can cause a loss of contact between the control radar and the transponder, particularly in the far coverage area of the radar.

Hereinafter in the text, to simplify the drafting, the term "transponder power" will be used to denote the radiated power $P_{Tr}$ of the transponder (in dBm) as seen by the radar, at a frequency of 1090 MHz and the term "transponder sensitivity" will be used to denote the sensitivity $S_{Tr}$ of the transponder (at 1030 MHz) measured on the antenna of the aircraft, thus including therein the losses due to the aircraft wiring between the transponder and its antenna (in dB) and the maximum gain of the antenna of the aircraft associated with the transponder (in dB).

SUMMARY OF THE INVENTION

One aim of the invention is to propose a solution that makes it possible to monitor the major performance levels of a transponder, a transponder operating in Mode S more particularly, even while this transponder is in operation onboard an aircraft.

Another aim of the invention is to propose a solution that makes it possible to use the interrogating secondary radar to perform the monitoring of a transponder operating in Mode S.

To this end, the subject of the invention is a method for performing the testing of correct operation, in operational phase, of a secondary radar transponder of an aircraft moving in an area covered by a secondary air traffic surveillance radar, characterized in that it comprises:

a first step which implements:

an operation of measurement of the power transmitted by the transponder, from the measurement of the power received from the transponder in reply to each interrogation transmitted by the radar;

an operation of measurement of the average rate of reply of the transponder to the interrogations transmitted by the radar, performed by counting the number of interrogations for which the radar has received a reply originating from the transponder;

the first step being performed while the operating parameters of the radar are not modified relative to the operational operating parameters;

a second step which implements an operation of measurement of the sensitivity of the transponder, performed by transmitting additional interrogations with transmission power levels increasing or decreasing over time, and by determining the transmitted power level during the transmission of the first interrogation below which the transponder does not transmit a reply;

the second step being performed by modifying the operating parameters of the radar so that the additional interrogations required for the measurement can be performed, during the time interval following the last operational interrogation during which the aircraft remains located within the main lobe of the Sum channel of the antenna of the radar, with a power transmitted in the direction of the transponder framing the sensitivity threshold of the transponder;

a third step which implements an operation of measurement of the maximum rate of replies that the transponder can sustain during a short time interval of given duration, the operation being performed by transmitting a plurality of additional interrogations and by counting the interrogations for which the transponder has transmitted replies;

the third step being performed by modifying the operating parameters of the radar so as to make it possible to transmit, during the time interval following the last operational interrogation during which the aircraft remains located within the main lobe of the Sum channel of the antenna of the radar, a number of successive interrogations that is sufficient to cause an absence of reply from the transponder.

According to various provisions that can each be considered separately or else considered in combination, the method according to the invention can have the following functional features.

According to a first feature, the power measurement operation of the first step is performed from the operational interrogations or additional interrogations transmitted to the transponder.

According to another feature, the operation of measurement of the local average rate of reply of the transponder of the first step is carried out by performing, for each antenna revolution, the detailed accounting of the ratio between the number of interrogations sent to the transponder and the number of replies obtained in the effective EBW lobe, and by calculating, in a sliding manner, the average value of this ratio over a given number of antenna revolutions or of antenna rendezvous.

According to another feature, in a multi-radar operating configuration, the execution of the operation of measurement of the local average rate of reply of the transponder of the first step involves a complementary operation that makes it possible to determine whether, in the case of an absence of reply to the interrogations transmitted by the radar during a given time interval, the interrogated aircraft is busy with the transmission of a reply to another radar belonging also to the multi-radar structure concerned.

The absences of reply considered are not, in this case, counted as such and the global average rate of reply is established on the basis of the presence or not of replies to interrogations transmitted by other radars.

According to another feature, the sensitivity measurement operation of the second step is performed by progressively reducing the power transmitted to the transponder. Additional interrogations are transmitted by the radar as soon as the power transmitted to the transponder passes below a given power value greater than the theoretical sensitivity threshold and within a power interval including this threshold. The successive additional interrogations are transmitted, while the power transmitted to the transponder decreases until no further reply is transmitted to the radar. The value of the average, between the signal power transmitted to the transponder for the last interrogation (74) to which the transponder has replied and that for which the transponder has not replied, determines the measured sensitivity level of the transponder.

According to another feature, the transmission power of the transmitter of the radar being reduced by a given number of decibels, additional interrogations are transmitted by the radar with decreasing power levels when, because of the misalignment of the main transmission lobe of the Sum channel relative to the direction of the aircraft, the power transmitted to the transponder changes within a power interval including the theoretical sensitivity threshold of the transponder.

According to another feature, if, from the first additional interrogation, the transponder does not supply a reply or if, upon the last additional interrogation, the transponder still transmits a reply, the sensitivity measurement step is re-executed on the next antenna revolution with a power transmitted by the transmitter respectively greater than or less than the power transmitted for the preceding measurement.

According to another feature, the transmitter being configured to transmit a signal to the transponder via the transmission lobes od the Difference channel with a given power, additional interrogations are transmitted by the radar when, because of the misalignment of the Difference channel transmission lobes relative to the direction of the aircraft, the power transmitted to the transponder passes above a given power value below the theoretical sensitivity threshold and increases within a power interval including this theoretical threshold. The successive additional interrogations are transmitted, while the power transmitted to the transponder increases, until a reply is transmitted to the radar. The value of the average, between the signal power transmitted to the transponder for the first interrogation to which the transponder has replied and the last for which the transponder has not replied, is considered to correspond to the measured sensitivity level of the transponder.

According to another feature, if, while the value of the power transmitted to the transponder is above the upper limit of the power interval considered, the transponder still does not transmit any reply, or if the transponder provides a reply from the first interrogation, the sensitivity measurement step is re-executed on the next antenna revolution with a power transmitted by the transmitter respectively greater than or less than the power transmitted for the measurement.

According to another feature, the operation of measurement of the maximum rate of reply of a transponder is performed by transmitting, to the transponder concerned, as soon as the last operational selective interrogation has been successfully executed, successive additional interrogations, separated from one another by a time interval consistent with the time interval of the maximum rate of reply to be measured, and by counting the replies transmitted by the transponders, and by determining the maximum reply time, so as to establish a measurement of the maximum rate for a given time unit, said rate being compared to the minimum rate imposed by the applicable regulation for determining the state of the transponder.

According to another feature, the different steps are executed several times during the flight of the aircraft, upon each antenna revolution, the results obtained for each measurement being used to calculate an average of the value of the weighted measured characteristic of the number of samples of each measurement and of the conditions of obtaining said measurement.

According to another feature, the different steps are executed for one and the same aircraft by several radars, the measurements obtained by each of the radars being used to calculate an average of the value of the weighted measured characteristic of the number of samples of each measurement and of the conditions of obtaining said measurement.

BRIEF DESCRIPTION OF THE DRAWINGS

The features and advantages of the invention will be better appreciated from the following description, a description which is based on the attached figures which present.

It should be noted that, in the attached figures, one and the same functional or structural element preferably bears one and the same number or letter reference symbol.

Figure 3:
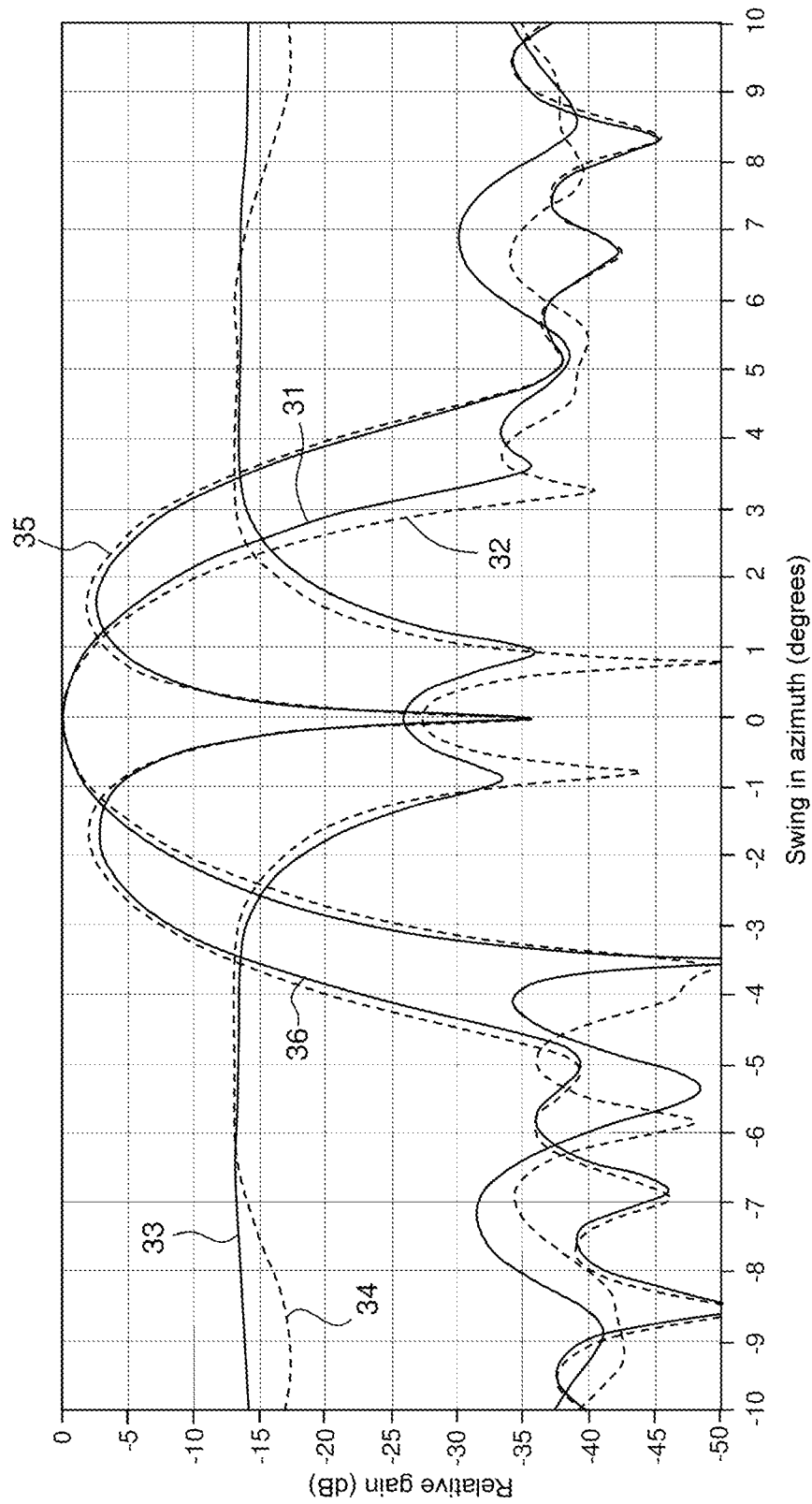
FIG. 3, an illustration presenting the radiation patterns in azimuth, in transmission and in reception, of the different antenna channels of the secondary radar illustrated by FIG. 2.

It should also be noted that, in FIGS. 5 to 9, the plots represent the power radiated to, or by, the aircraft concerned during assessing performance levels of its transponder, the latter takes account of the antenna pattern in azimuth of FIG. 3, weighted for the transmission of the power of the interrogation.

Represented therein, as an example, in a split manner, are the operational processing phase, required to detect the target and position it, and the phase of testing of correct operation, required to evaluate the performance levels of the transponder. The solid lines represent the radiated power during the 2 phases in interrogations of the radar.

DETAILED DESCRIPTION

Figure 1:
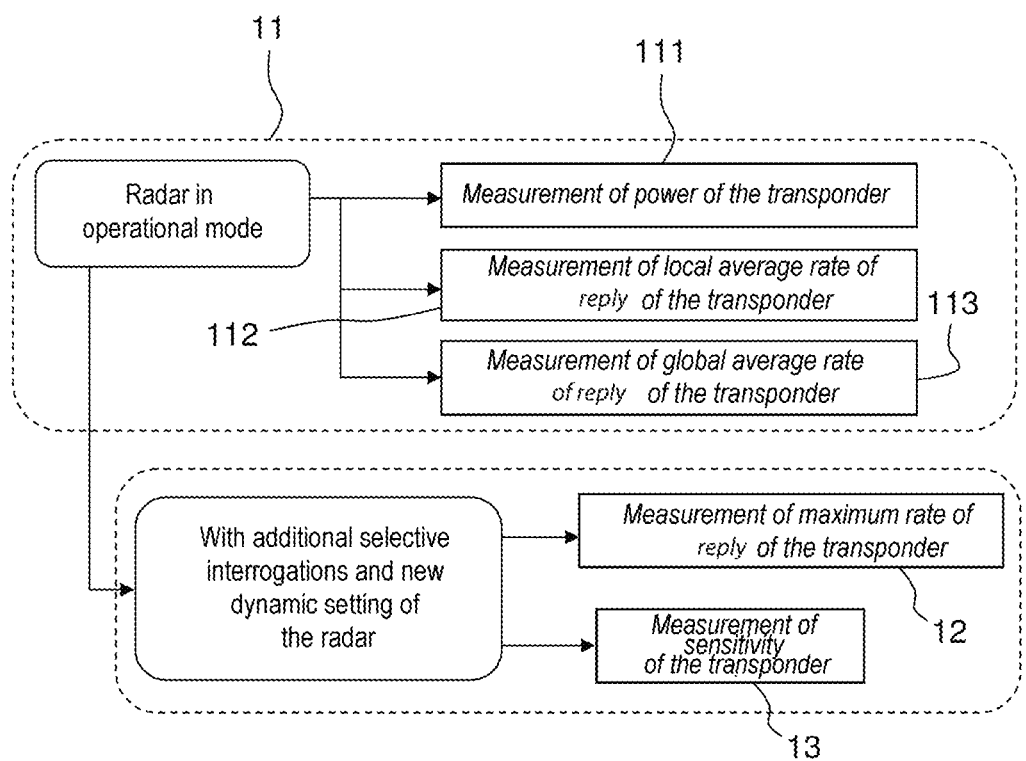
FIG. 1, a block diagram of the method according to the invention.

The general concept of the method for testing in operational phase according to the invention (i.e. the solution provided by the invention to the problem posed) comprises, as FIG. 1 illustrates, three distinct steps:

a first step 11 during which the replies of the transponder to the interrogations in Mode S transmitted in operational Mode by the secondary radar are used to perform:

the measurement 111 of the power of the transponder, the measurement 112 of the local average rate of reply to the interrogations in Mode S transmitted by the radar intended for it, and, in addition:

the measurement 113 of the overall average rate of reply to the interrogations in Mode S of a transponder with respect to all the radars managing it.

It should be noted that the execution of the measurement 113 is, of course, necessary only if different radars simultaneously manage the transponder and that it is possible only if the different radars managing the transponder concerned cooperate within a global control system, as is explained hereinbelow in the text.

During this step, the method according to the invention uses only the signals and operational data exchanged in the context of operation in Mode S;

a second step 12 during which the measurement of the sensitivity of the transponder is performed, by means of additional interrogations in Mode S transmitted by the radar in addition to those transmitted in operational operation phase.

A third step 13 during which the replies of the transponder to additional selective interrogations transmitted by the radar specifically for the transponder considered are used to perform the test of its maximum rate of reply.

According to the invention, the first step 11 of the test method can be implemented during the phase of operational exchanges between the radar and the transponder; whereas the second step 12 and the third step 13 are performed outside of the phases of operational exchanges between the radar and the transponder and require a real time modification of the operation of the radar.

Also according to the invention, it is the execution of the set of measurements that constitute the different steps of the method which makes it possible to determine the state of correct operation of the transponder concerned.

Consequently, a transponder is considered to be in a good state of operation if the measurements that constitute the different steps of the method according to the invention conform to the specifications of the International Civil Aviation Organization (ICAO) relative to each of the functional characteristics measured (cf. annex 10—volume IV of the convention on International Civil Aviation).

However, the different steps 11, 12 and 13 of the method are independent such that they can be formed in any order which depends in particular on the possibility of executing a particular step of the method, a possibility which assumes that certain conditions are met. The order of execution of the steps of the method according to the invention is conditioned in particular by the imperatives of operational operation of the radar.

Thus, the step 11 can be performed permanently during operational operation when the target is within areas where it is ascertained:

for the power measurement (operation 111), that the propagation of the waves takes place without disturbance in order for the measurements to be as little effected by error as possible, for a reliable measurement of the average rate of reply of the transponder:

that no other radar is likely to interrogate the transponder in which case the operation 112 renders a reliable result concerning the average rate of reply; or that all the radars liable to interrogate the transponder are connected to a control centre and transmit their data to the latter, in which case the execution of the complementary operation 113 makes it possible to render a reliable result concerning the average rate of reply.

Similarly, the steps 12 and 13 must be performed when the aircraft carrying the interrogated transponder is moving within areas where additional Mode S interrogations are not likely to disturb the operation of the other radars which perform transactions with the aircraft concerned, and where the transponder is interrogated little by other radars in order for the measurements to be reliable.

Moreover, each step can be repeated several times for one and the same transponder, the number of times that a measurement is performed being linked in particular to the expected measurement accuracy. It is thus possible, far example, to consider, in a first estimation, that ten or so measurements per transponder performed in the conditions described previously allow for a first level of estimation of the performance levels, i.e. an execution time of the order of 1 minute per radar.

It should be noted that all the measurements performed on a transponder can advantageously be memorized and correlated over periods covering several flights of the aircraft onboard which the transponder is placed, to trace the evolution of the measurements over time in order to detect a gradual degradation of the transponder.

Hereinafter in the text, each of the three steps is described in detail. For this, and to make the principle of operation of the method according to the invention more clear, the case of a typical secondary radar whose structure and principle of operation are described on the basis of FIGS. 2 to 5 is considered.

Figure 2:
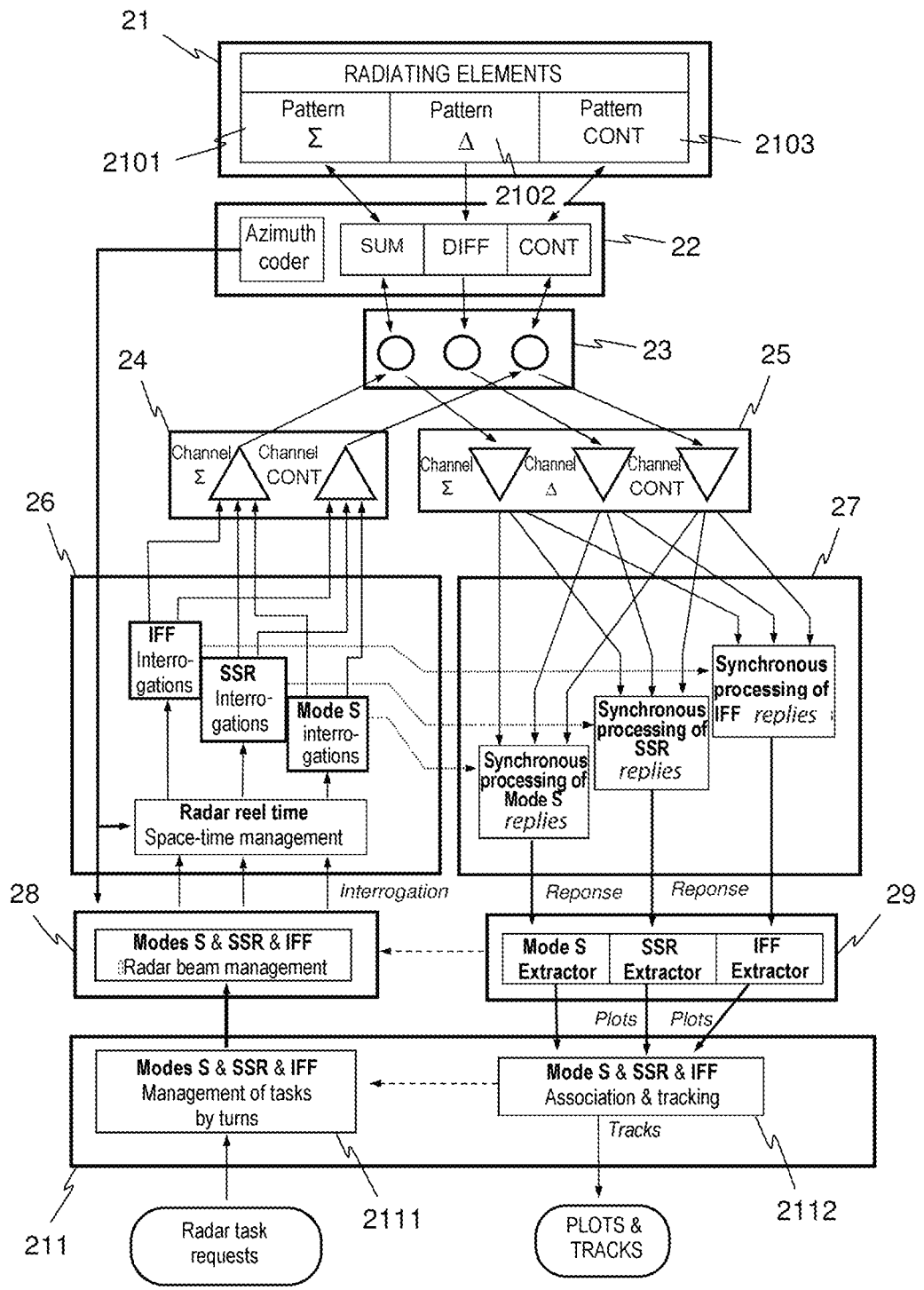
FIG. 2, a schematic diagram of the operation of a secondary radar capable of implementing the method according to the invention.

FIG. 2 schematically presents the main constituent elements of a secondary radar, IFF (Identification Friend or Foe) radar, SSR (Secondary Surveillance Radar) radar or Mode S radar, taken as example, in which the method according to the invention can be implemented.

The radar presented here, by way of example, is a conventional radar comprising an antenna 21 configured to exhibit three radiation patterns corresponding to the conventional channels of a secondary radar:

a first uplink and downlink channel 2101, called "Sum" channel or $\Sigma$ channel which corresponds to the main lobe of the antenna;

a downlink channel 2102, called "Difference" channel or "DIFF" channel or Α channel, generally downlink (it is the azimuth channel that is of interest here);

a second uplink and downlink channel 2103, called control channel or CONT channel or "$\Omega$" channel or SLS (Side Lobe Suppression) channel which makes it possible to determine, as is known, the signals received by the secondary lobes of the Sum channel pattern of the antenna in ISLS (Interrogation Side Lobe Suppression) transmission in RSLS (Reception Side Lobe Suppression) reception.

It should however be noted that the test principle implemented by the method according to the invention can be implemented in other types of radars. Depending on the missions allocated to the radar concerned and therefore depending on the expected performance levels of the radar, the antenna with which the radar concerned is equipped can be characterized by several elements:

1) the number of patterns presented:

4 patterns: Sum ($\Sigma$ channel), Difference ($\Delta$ channel), front control (CONT_Front channel) and back control (CONT_Back channel);

3 patterns: Sum ($\Sigma$ channel), Difference ($\Delta$ channel) and Control (the CONT_Front and CONT_Back channels being grouped together at the level of the antenna);

2 patterns: Sum ($\Sigma$ channel), Difference and Control (the channels $\Delta$ channel, CONT_Front & CONT_Back being grouped together at the level of the antenna).

2) its width dimensions: an antenna of great width makes it possible, as is known, to form a thin main beam (Sum channel main lobe) which provides a high gain and a strong selectivity and accuracy in azimuth;

3) its height dimensions:

an antenna of large height, of the Large Vertical Aperture (or LVA) type exhibits a significant gain and provides protection against ground reflections (useful primarily in ATC);

an antenna of small height, of "beam" type provides mobility.

As is known, for an ATC antenna, the patterns of the Sum and Difference channels are conventionally thin with secondary lobes at 3 dB between 2.4° and 10°, whereas the patterns of the Control (CONT_Front and CONT_Back) each seek to cover practically 180°.

It should also be noted that the test principle implemented by the method according to the invention can be implemented in different types of radar equally comprising fixed pattern antennas such as revolving antennas, called "mechanical scanning" antennas, and by antennas with changing patterns such as antennas with fixed or revolving electronic scanning, such as the active antennas with electronic scanning (Active Electronically Scanned Array or AESA) antennas.

The test of the text, illustrated by FIGS. 2 to 10, describes the method according to the invention based on the structure of an ATC secondary radar, taken as an example, equipped with an antenna with three patterns, Sum, Difference and Control.

In the context of a secondary radar, the antenna 21 is configured so as to cover a frequency band covering the frequency of the Mode S interrogation signals transmitted by the radar (1030 MHz), and the frequency of the signals transmitted by the transponder (1090 MHz), of the replies to the interrogations from the radar in particular.

As FIG. 2 illustrates, a secondary radar comprises, as is also known, different functional elements whose role is briefly described hereinbelow.

The rotating joint 22 ensures the radio frequency coupling (RF coupling), between the revolving part and the fixed part of the radar, of the signals at 1030 MHz and at 1090 MHz corresponding the different antenna patterns. It also ensures the delivering of the azimuth position of the axis of the main lobe of the sum channel pattern of the antenna;

The duplexer 23 ensures the coupling of the transmitter 24 and of the receiver 25 of the radar to the different channels of the antenna;

The transmitter 24 produces and delivers, over the Sum channel and the CONT channel, the RF signals at 1030 MHz, corresponding to the interrogations transmitted by the radar. The transmissions over the CONT channel make it possible, as is known, to identify and block (i.e. prevent them from being taken into account by the radar) the replies originating from transponders received by the secondary lobes of the Sum channel of the antenna 21 (ISLS interrogations).

The operation of the transmitter is similar for the different communication protocols, IFF, SSR and Mode S, used by the secondary radar.

The receiver 25 ensures the reception of the RF signals at 1090 MHz corresponding to the replies of the transponders, received over the different channels, Sum 2101, Difference 2102 and Control 2103 channels.

The operation of the receiver is similar for the different IFF, SSR and Mode S protocols.

The real-time management module 26 of the radar performs the Space Time Management (or STM) of the radar, in other words the real-time management of the associated interrogation and listening periods, for the different IFF, SSR and Mode S protocols.

To this end, it conducts in real time the interrogations transmitted, in the form of RE signals, by the transmitter 24 over the Sum 2101 and Control 2103 channels.

The Signal Processing (or SP) module 27 ensures the detection of the replies received by the radar during the listening periods associated with the interrogations, for the different IFF, SSR and Mode S protocols, according to their definitions by the space time management unit of the radar.

To this end, it ensures the detection and the decoding of the synchronous replies transmitted by the transponders by using the RF signals received by the different reception channels 2101, 2102 and 2103 of the antenna:

the RF signals received by the Sum channel, to detect the replies received by the main lobe of the antenna pattern;

the RF signals received by the Difference channel, in particular to finely locate in azimuth the replies received by the main lobe of the antenna pattern;

the RF signals received by the Control channel, to reject the replies received by the secondary lobes of the antenna pattern. The receptions over the CONT channel make it possible, as is known, to identify and block (i.e. prevent them from being taken into account by the radar) the replies originating from transponders received by the secondary lobes of the Sum channel of the antenna 21 (RSLS function).

The management and sequencing module 28 ensures the preparation of the transactions (interrogations & replies) to be performed, as a function of the azimuth of the main lobe of the Sum channel pattern of the antenna, for the different IFF, SSR and Mode S protocols.

To this end, it ensures:

the taking into account of the targets present in the main antenna lobe (radar beam scheduling) for the azimuth considered;

the placement of the Mode S interrogations et replies within the future period of operation in "roll call" mode as a function of the state of the transactions that have just been performed. It is recalled here that, as is known, a period of operation in "roll call" mode consists of a time interval during which, conventionally, the dialogue (interrogation & reply) is performed selectively with each aircraft whose transponder is operating in Mode S, present in the main lobe of the Sum channel pattern of the antenna.

The extractor module 29 ensures, conventionally, the function of construction of blips, usually called extraction, for each of the different IFF, SSR and Mode S protocols, from the synchronous replies corresponding to the messages conveyed by the RF signals received by the different reception channels 2101-2102-2103 of the radar.

The multiturn management (task scan management) module 2111 primarily ensures the management of the Mode S tasks to be performed in turns for the transponders belonging to aircraft moving in the surveillance area of the radar.

To this end, it comprises a module ensuring the prediction of the positions of the aircraft for the future antenna rendezvous and the preparation of the task to be performed according to the external requests and the state of the transactions performed previously.

The blips association and target tracking (association & tracking) module 2112 ensures, in the surveillance area of the radar, the tracking of the targets by association of the plots obtained with one revolution with the existing track derived from the prior plots of the same target, in order to improve the performance levels (eliminating false plots, control of decoded data, etc.) in following aircraft and above all predict the future position of the latter in the next antenna rendezvous.

Antenna rendezvous is understood to mean the passing of the main Sum channel lobe of the antenna over the aircraft concerned. In the case of an antenna with fixed pattern and with mechanical scanning, it occurs once per antenna revolution. On the other hand, in the case of an antenna with electronic scanning, it occurs at the rhythm at which the main lobe of the antenna is pointed at the position of the aircraft. Hereinafter in the text, unless specified otherwise, the concepts of antenna revolution and of antenna rendezvous are grouped together under the term "antenna revolution".

As FIG. 2 illustrates, the operation of a secondary radar in Mode S (but also in SSR and IFF modes) is a synchronous operation which proceeds through the generation of successive interrogations and through the synchronous processing of the corresponding replies, the synchronization being embodied in the figure by the arrows linking the modules 26 and 28 respectively to the modules 27 and 29 and by the arrow linking the modules 2111 and 2112.

Figure 4:
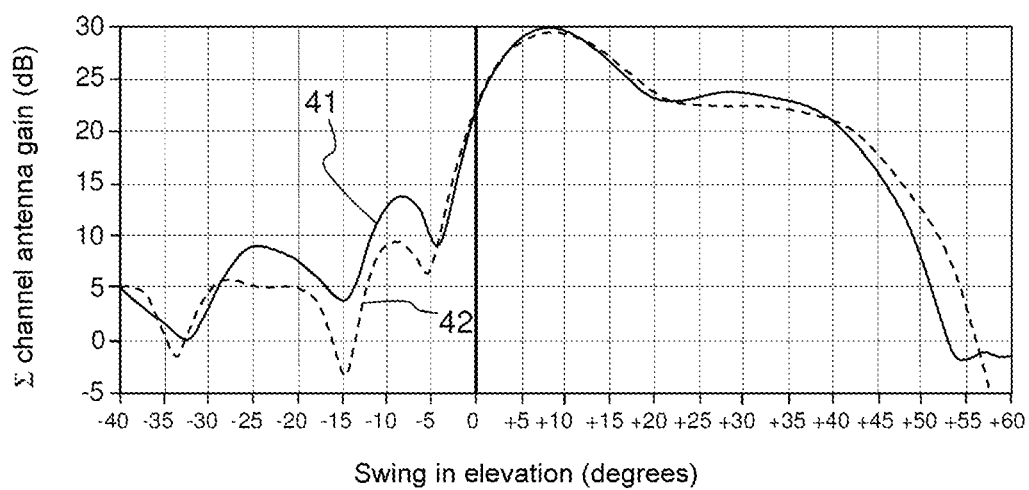
FIG. 4, an illustration presenting the radiation patterns in elevation, in transmission and in reception, of the Sum channel of the secondary radar illustrated by FIG. 2.

FIGS. 3 and 4 present typical antenna patterns corresponding to the radiation pattern of an antenna 21 with an ATC secondary radar can in particular be equipped.

FIG. 3 presents the relative gain (in dB) of each of the channels of the antenna as a function of the swing in azimuth (in degrees) about the central axis of the main lobe 31 of the Sum channel of the antenna (Σ channel) for the transmission frequency (1030 MHz), the relative gain being considered by taking the maximum gain of the main lobe as reference (0 dB). The curve 32 represents the antenna pattern of the main lobe of the Sum channel of the antenna (Σ channel) for the reception frequency (1090 MHz), the curves 33 and 34 represent the antenna patterns of the Control channel (CONT channel), for the transmission frequency (1030 MHz) and for the reception frequency (1090 MHz) respectively, whereas the curve 35 represents the antenna pattern of the Difference channel (Δ channel) for the reception frequency (1090 MHz).

For its part, FIG. 4 presents the curves 41 and 42 of variation of the gain in absolute value (in dB), as a function of the swing in elevation (in degrees) of the main lobe of the Sum channel (Σ channel) of the antenna, for the transmission frequency (1030 MHz) and the reception frequency (1090 MHz) respectively.

As FIGS. 3 and 4 illustrate, the antennas of the air traffic control (ATC) secondary radars conventionally exhibit, because of the low difference that exists between the frequencies radiated by the radar and by the transponder, 1030 MHz and 1090 MHz respectively, Sum channel, Difference channel and Control channel patterns that are very similar in transmission and reception, both in elevation and in azimuth. Also to be noted is just a slight difference in maximum gain, often of the order of 1 dB, between frequencies of 1030 MHz and of 1090 MHz.

Nevertheless, although differences observed are low, the implementation of the different control operations performed by the method according to the invention are preferentially performed by considering the antenna pattern that best reports the characteristics of the antenna involved in the measurement concerned, so as to guarantee the best accuracy.

Thus for example:

for the check on the sensitivity of the transponder (step 12), the pattern 31 of the main Sum channel lobe at the 1030 MHz frequency (radar transmission frequency) will be considered;

for the check on the power of the transponder (step 11), the pattern 32 of the main Sum channel lobe at the 1090 Mhz frequency (transponder transmission frequency) will be considered.

Figure 5:
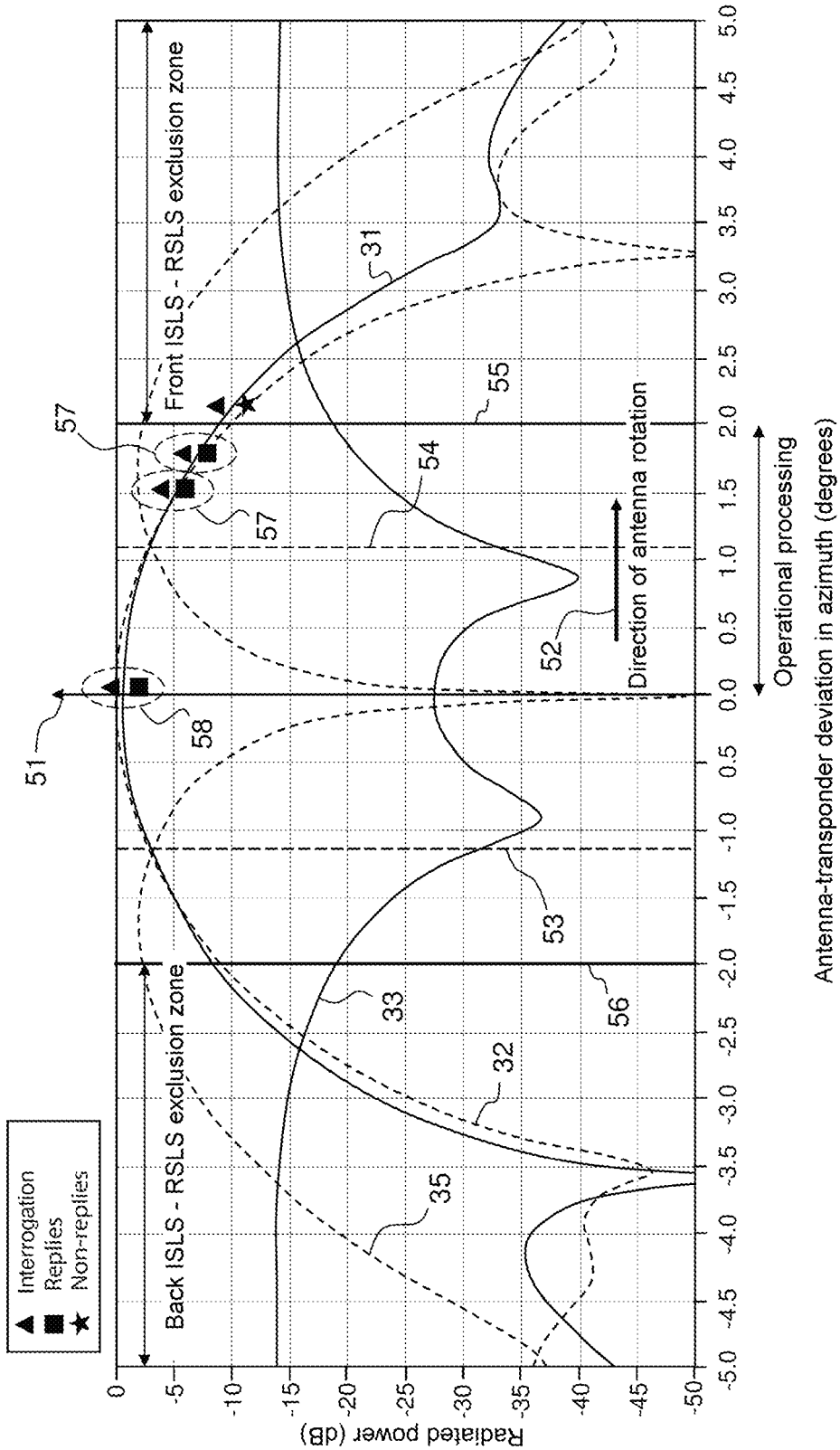
FIG. 5, a diagram illustrating the principle of ideal sequencing of the operational interrogations in Mode S performed, for an aircraft, by a secondary radar.

The illustration of FIG. 5 makes it possible to present simply, through an ideal case, the principle of operation, in operational mode, of the radar management of the selective interrogations and replies in Mode S, for a given aircraft located in the main lobe 31 (transmission lobe at 1030 MHz), 32 (reception lobe at 1090 MHz) of the Sum channel of the antenna 21.

Regarding FIG. 5, and FIGS. 6 to 9, it should be noted that in the rotation of the antenna 21, the main axis thereof shifts in azimuth according to the increasing geographic azimuths (as indicated by the arrow 52), so that, by considering the direction of the main axis 51 as reference in azimuth regardless of the instant considered, the illustrations of FIGS. 5 to 9 make it possible represent the variation over time of the position in azimuth of a given aircraft relative to the main axis of the antenna.

Consequently, an aircraft lit up by the main lobe of the Sum channel of the antenna will see its position in FIGS. 5 to 9 shift, over time, from right to left in the figure concerned.

The purpose of the nominal management of the operation of the radar is to precede in such a way, as is known, that the transponder of an aircraft concerned be interrogated at least once when the latter is located in the useful main lobe area 31-32 of the Sum channel of the antenna (area between the 2 dotted vertical lines 53 and 54 in FIG. 5) at the point where, as is known, the monopulse function of the radar, which involves the signals received by the Difference channel 35 (Δ channel), makes it possible to locate the target in azimuth accurately.

For that, the management member of the radar predicts the position of the aircraft in geographic azimuth for the antenna revolution considered and begins selectively interrogating the target only from the instant when, given the speed of rotation of the antenna 21 (or of scanning of the beam), the front edge of the main lobe 31-32 of the Sum channel of the antenna intersects the predicted geographic azimuth of the target. This instant is embodied by the line embodied by the solid line 55 in FIG. 5. The line 55 is defined a priori as a function of the predicted position of the aircraft and of the parameterizing of the ISLS and RSLS functions as well as the width of the main lobe 31-32 of the antenna. Similarly, the line 56 delimits the back edge of the main lobe 31-32.

After the instant of crossing of the line 55, the aircraft can potentially be detected according to the prediction of position, azimuth and distance, calculated from the prior revolutions, the radar performs the transactions 57 and 58 (selective interrogations and replies) relating to the aircraft concerned while the antenna lobe moves (i.e. performs a scan of the space) in azimuth.

The transactions 57 at the start of the lobe serve to perform exchanges of data between the radar and the aircraft. If a first interrogation (the star) does not induce a reply (in the case of the drawing, because of the exclusion of ISLS-RSLS), the radar positions another interrogation for this same aircraft in the next roll call period.

The radar also performs a transaction 58 while the aircraft is located placed substantially on the axis of the antenna lobe 31-32 because of the rotation of the antenna. This transaction performed for this particular position of the aircraft in the antenna lobe 31-32 advantageously makes it possible to perform, as is known, an accurate measurement of the azimuth of the target. This accurate angular position is used to determine the instants between which a test operation can be performed.

It should be noted that, through its operation, the radar is consistent with this operating principle. For any deviation in azimuth greater than that corresponding to line 55 or less than that corresponding to the line 56:

the ISLS function active in transmission blocks the transponder the RSLS function active in reception eliminates the asynchronous replies received by the secondary lobes or received by the outer areas of the main lobe 32. These outer areas are in particular the areas of the main lobe of the Sum channel pattern situated outside of a central angular area, extending typically over ±2° for an ATC secondary radar antenna in azimuth about the central axis 51 of the main Sum channel lobe 32.

Asynchronous replies are understood to mean replies transmitted by the aircraft in reply to interrogations performed by other radars, or even messages transmitted by the transponder in an unsolicited manner.

Thus, two exclusion areas are defined: a front ISLS-RSLS exclusion area (azimuths greater than the azimuth embodied by the line 55) and a back ISLS-RSLS exclusion area (azimuths less than the azimuth embodied by the line 56), as illustrated by FIG. 5.

Conventionally, the radar budget in Mode S is balanced between the uplink (interrogation of the radar at 1030 MHz) and the downlink (reply of the transponder at 1090 MHz).

This way, whatever the distance from the target, the replies solicited by the radar, that is to say the replies responding to the interrogations detected by the transponder, are detectable by the radar.

For that, the downlink is preferentially slightly more powerful than the uplink in order for all the replies transmitted, by the weakest link that is the transponder, can be correctly detected by the one which has solicited them.

The typical secondary radar structure to which the method according to the invention can be applied, and the principle of management of the transactions in Mode S, having been described generally in the preceding text, interest is focused on the implementation of the implementation of the different steps of the method according to the invention.

As has been stated previously, the first step 11 can be implemented without the need to modify the parameters of the radar or its operational sequencing.

This first step comprises a first operation 111 consisting in measuring the transmission power of the transponder concerned, and a second operation 112 consisting in measuring the local average rate of reply of the transponder.

According to the invention, the first operation 111 of calculation of the power of a transponder can be performed on all of the aircraft located in the coverage area of the radar. The frequency considered here is the reception frequency of 1090 MHz.

For this operation, the radar measures, for the reply obtained from the transponder concerned mainly for each transaction occurring in an area delimited by the dotted lines 53 and 54 (see FIG. 5) that can extend, if necessary, to the area delimited by the lines 55 and 56, the power of the received signal, and calculates the corresponding power in the area of maximum gain of the radar antenna, in other words the power which would have been measured if the same signal had been received by the antenna 21 at the point of maximum gain (summit) of the antenna lobe 32.

According to the invention, the calculation made introduces the attenuation as a result of the misalignment in azimuth of the direction of the signal carrying the reply received relative to the axis of the antenna lobe and takes account of the distortion of the lobe in azimuth as a function of the elevation of the target. This distortion does however remain minor for low elevations.

Consequently, the first operation 111 of the step 11 consists in:

calculating, for each reply, the power of the signal (radar plots) received by the radar calculating the average of the powers calculated for the replies nearest to the axis of the antenna (replies exhibiting the lowest misalignments);

weighting the average obtained to take account of the attenuation in elevation, that is to say by considering the decrease in gain for the real elevation of the target with a maximum gain of the antenna in elevation;

calculating the power transmitted by the transponder by taking account of the various transmission losses, namely the losses specific to the radar such as cables and rotating joint but also the propagation losses at the frequency of 1090 MHz due to the distance between the radar and the antenna, even the characteristic atmospheric losses of the radar site and of the position of the aircraft with respect to the radar in distance and elevation;

comparing the value of the calculated transmitted power to a threshold determined as a function of ICAO provisions (Annex 10) to determine whether the power of the transponder conforms to the required power (transponder in operational conditions) or if it is insufficient characterizing degraded or even defective operation.

The power thus calculated from each reply received by the radar can be expressed by the following relationship:

$$P_{Tr} = P_{Recept} + L_{Lobe\_azim} + (L_{Lobe\_elev} - G_{Recept}) + L_{Recept} + (L_{Atm} + L_{Lobe\_Tr} + R + f(\text{fréquence})) \quad [01]$$

in which:

$P_{Tr}$, represents the power radiated by the transponder (in dBm) seen by the radar, at a frequency of 1090 MHz;

$P_{Recept}$, represents the power of a reply received by the receiver of the radar (in dBm);

$L_{Lobe\_azim}$, represents the loss of gain of radar antenna as a function of the azimuth (in dB);

$L_{Lobe\_elev}$, represents the loss of gain of the radar antenna as a function of the elevation (in dB);

$G_{Recept}$, represents the maximum gain of the radar antenna in reception (in dB);

$L_{Recep}$, represents the losses between the radar receiver and its antenna (in dB);

$L_{Atm}$, represents the atmospheric losses (in dB);

$L_{Lobe\_Tr}$, represents the loss of gain of the antenna of the transponder in elevation (in dB);

R, represents the propagation losses due to the distance between the aircraft and the radar (in dB), f (fréquence), represents a constant that is a function of the 1090 MHz frequency.

Most of the above quantities are established for each radar its factory production ($G_{Recept}$) and its installation on site ($L_{Recept}$), others are calculated dynamically as a function of the position of the target (R, $L_{Lobe\_Tr}$, $L_{Atm}$, $L_{Lobe\_elev}$), even of the reply in the lobe ($L_{Lobe\_azim}$).

It should be noted that the concept of the operation 111 described above can be applied to any type of transponder (Mode S, SSR or IFF).

Moreover, the concept of the operation 111 applies to any type of replies transmitted by a transponder, even to those triggered by the additional Mode S selective interrogations generated for the execution of the steps 12 and 13 of the method according to the invention.

The second operation 112 of measurement of the local average rate of reply of the transponder consists in counting, over all of the transactions performed by the radar with respect to the transponder concerned, the number of transactions for which an interrogation has actually been followed by a reply from the transponder.

Figure 6:
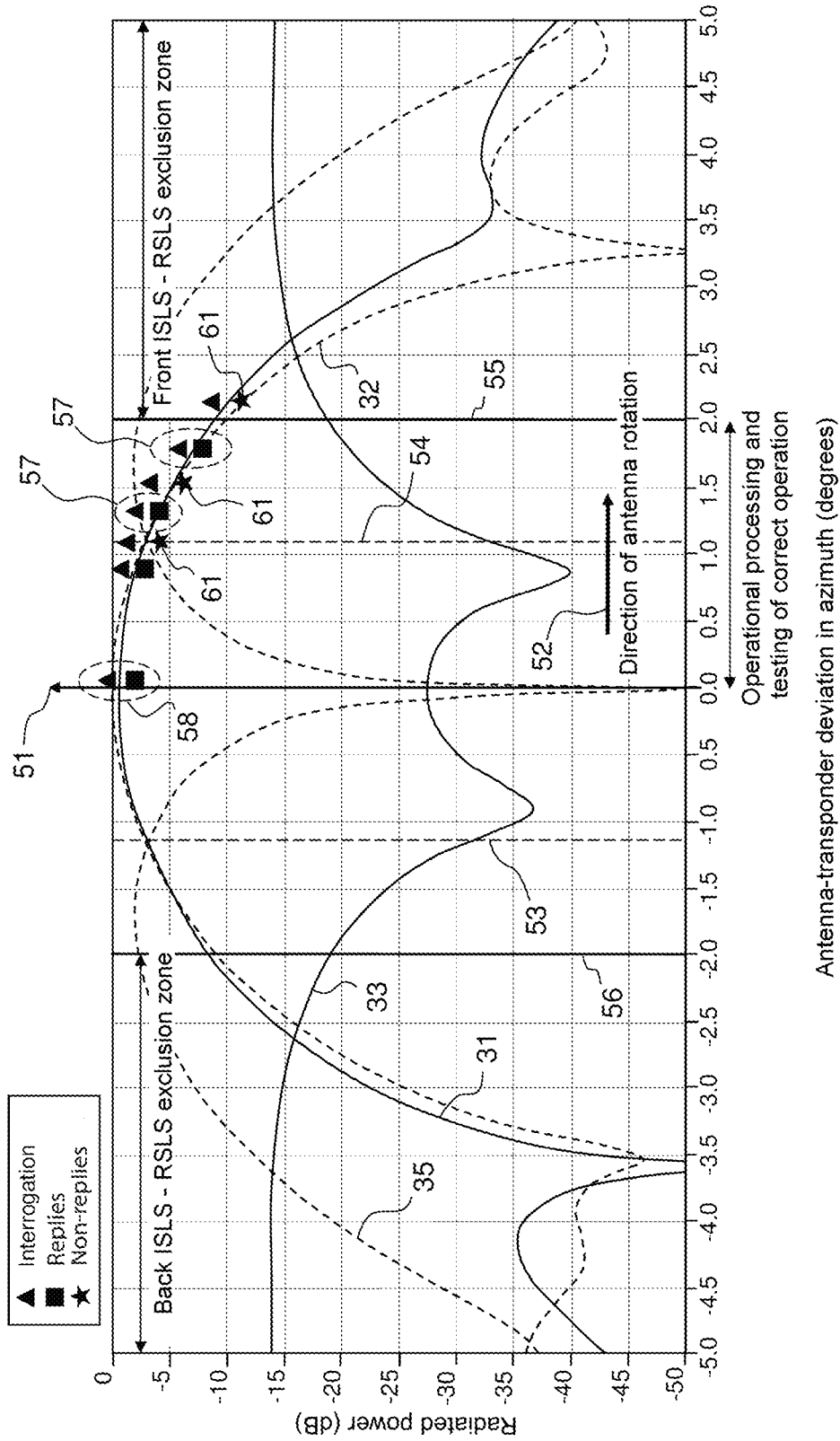
FIG. 6, a diagram illustrating the principle of sequencing of the operational interrogations in Mode S in the context of the steps of measurement of power and of the average (local and global) rates of reply, of the method according to the invention.

A transponder is in fact sometimes not able, for various reasons, to reply to all the selective interrogations which have been addressed to it by the radar for a given antenna lobe, as FIG. 6 illustrates. Consequently, some interrogations 61 can remain without reply.

This absence of reply can be explained by an excessively high rate of occupancy of the transponder, which can for example be solicited by other interrogators (radars, WAM or "Wide Area Multilateration", etc. . . . ), in which case it does not necessary constitute a symptom of failure of the transponder.

However, the absence of systematic reply to the interrogations of the radar can also be a result of transponder operation problems. Also, it is advantageous from the point of view of monitoring the state of the transponder to measure the rate of reply thereof.

To perform this measurement, after having preceded with an accurate location of the target (transaction 58), the method according to the invention performs, for each antenna revolution, a count of the number of interrogations sent to the transponder concerned and of the number of replies obtained in the azimuth area extending between the straight lines 55 and 56, in which the transponder ought to reply and the radar ought to receive, and accumulate, revolution by revolution, the result obtained so as to determine the average rate of reply of the transponder. This local average rate is calculated in a sliding manner, over a given number of antenna revolutions, in other words a given number of passages of the antenna lobe over the aircraft equipped with the transponder concerned.

Consequently, depending on the value of this local average weight, the transponder is considered to be in a nominal (operational) state of operation according to the specifications set out by the ICAO, or to be operating in a degraded Mode with respect to the radar.

According to the invention, this average rate is calculated by also taking into account:

the setting of the radar (RSLS, ISLS) and the distance from the target to define the effective lobe (EBW or "Effective Beam Width");

the fact that a reply that is detected but not decoded by the radar because of overlapping replies is here considered to be a reply from the transponder (although not decoded by the radar), so as not to penalise the performance of the transponder by detection limitations of the radar.

It should be noted here that a low rate of reply can be linked to the passing of the aircraft into geographic area of over-interrogation, an area covered by several interrogators for example, which causes a reduction, for this particular area, in the local rate of reply of the transponder to the interrogations of the radar concerned.

However, this drop in the local rate of reply, whether or not attributable to a malfunction of the interrogated transponder, can however be taken into account automatically or by choice of the operator of the radar to adapt the operational behaviour of the radar, for example to increase the number of selective interrogations for the aircraft for which the transponder displays with a bad average rate of reply and which are moving around in sensitive areas in which the permanent tracking of all the aircraft is required.

It should also be noted that, in the context of a multi-radar operation, allowing the execution of the operation 113 of the method according to the invention, the radar concerned transmits, on each antenna revolution, at the traffic control centre on which it depends, the transactions applied for each target in the effective lobe of the antenna. Each element of a Mode S transaction (i.e. each interrogation and the expected reply—obtained or not) is accurately date-stamped.

Consequently, in the coverage areas common to several sensors, the control centre can then:

calculate for each unit of time (typically a sliding second) a global average rate of reply for each aircraft moving in a common surveillance area: this digital merely reflects the average rate of reply of the transponder and makes it possible to determine whether a failure of the transponder concerned is really observed;

register the geographical areas in which this average rate of reply of the aircraft is degraded: this knowledge of the geographic areas with over-interrogation can lead to the settings of the sensors which are involved in the areas being modified so as to thus improve the security of the control provided.

It should be noted that the concept of the operation 112 described above can be applied to any type of transponder (Mode S, SSR or IFF).

The second step 12 of measurement of the sensitivity of the transponder consists in transmitting to the transponder, for one and the same antenna revolution, a succession of interrogations, the signal conveying this interrogation exhibiting a power which decreases or increases from one interrogation to the next, then by detecting the reception of the corresponding replies.

The sensitivity of the transponder is then defined by the average of the signal power transmitted to the transponder for the last interrogation to which the transponder has replied and of that for which the transponder has not replied.

This sensitivity is then compared to a fixed threshold, based on which the sensitivity of the transponder is considered to conform or not to the specifications set out by the ICAO.

The implementation of this step requires the signal level transmitted by the radar to the transponder to be modified dynamically. Dynamic modification is understood here to mean that the adjustment of the radar must be performed independently for each transaction (interrogation/reply) undertaken with the aircraft concerned.

According to the invention, this step is preferentially implemented when the aircraft concerned is at a near or medium distance from the interrogating radar, typically a distance less than 120 Nm.

Moreover, the objective of the step 12 being to measure the characteristics relating to the uplink (this link including the receiver of the transponder), it is essential that the downlink (i.e. the transponder-radar link) be no longer desensitized so that a failure of a transaction cannot be attributable to a loss of sensitivity of the radar.

To this end, in the context of the method according to the invention, the sensitivity measurements are performed by disabling at the reception level, the TVBC ("Time Variable Based Clamping") function during the interrogation of the transponder.

It is recalled here that, as is known, the TVBC function is a function, commonly implemented within the secondary radars, which acts with respect to the signal received by the radar so as to limit the formation of false plots at shortened medium range. It thus ensures a quasi-constant received signal dynamic range, whose amplitude (in dB) is determined by the number of the TVBC law chosen by the operator.

To this end also, to be sure that a loss of detection is truly attributable to the sensitivity of the transponder but not to another cause, the energy transmitted by the radar towards the interrogated transponder is reduced, so as to favour the downlink (i.e. the transponder-radar link) over the uplink (i.e. the radar-transponder link). A dynamic attenuation of the order of 20 dB is for example applied at the radar transmission level only for the target concerned.

To further attenuate the signal level transmitted to the transponder dynamically, the method according to the invention proposes various solutions.

A first solution consists in varying, from one interrogation to the next, the signal level transmitted to the transponder by the main Sum channel lobe of the antenna. This transmitted power is then varied to a value that is sufficient to obtain a non-detection of the interrogation on the part of the transponder.

According to a first implementation of this first solution, not illustrated, that is applicable when the transmitter of the radar can be controlled to deliver with the desired accuracy a given power line within a variable range, the dynamic range of variation being otherwise sufficient, the measurement of sensitivity of the transponder is performed by interrogating the transponder concerned by varying the power delivered by the radar transmitter through the main Sum channel lobe of the antenna, from one interrogation to another, by dichotomy, by beginning in the vicinity of the theoretical sensitivity value of the transponder, until, for a given power, an absence of reply from the latter is observed. This operation can be prepared as soon as the operational interrogations 57 and 58 of the transponder by the radar are performed at nominal power.

Figure 7:
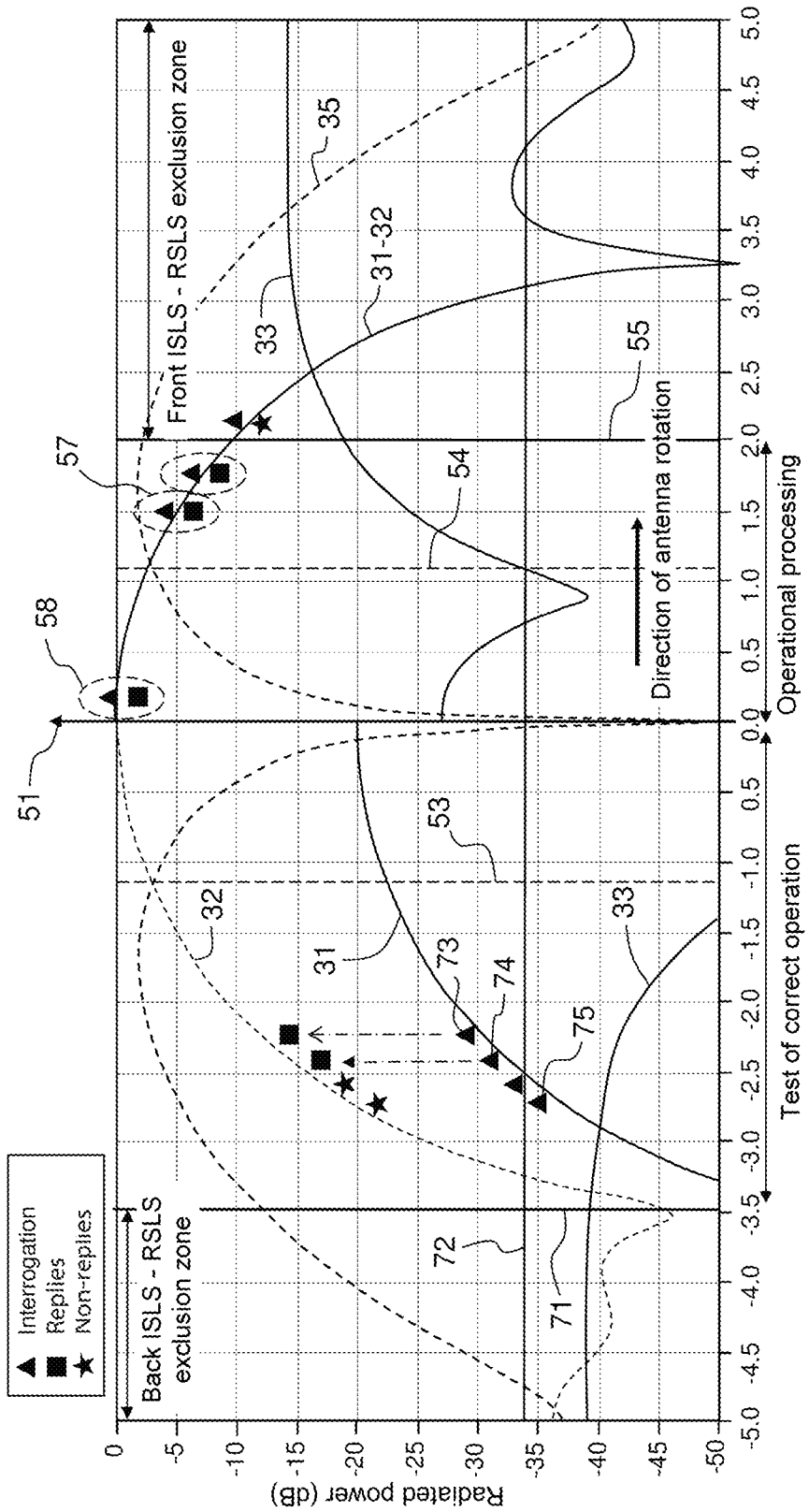
FIG. 7, a diagram illustrating the principle of sequencing of the operational interrogations in Mode S and of the additional interrogations in the context of the step of measurement of the sensitivity of the transponder, in a first implementation of the method according to the invention.

Alternatively, according to a second implementation of this first solution, applicable in particular if the characteristics of the radar transmitter do not make it possible to measure the sensitivity of the transponder with the required accuracy by direct attenuation of the transmitted power (case where the aircraft is very close to the radar for example), the measurement of sensitivity of the transponder is performed by exploiting the variation over time of the misalignment of the main antenna lobe relative to the azimuth of the aircraft, as FIG. 7 illustrates, so as to obtain a variation of the power radiated towards the aircraft.

According to the invention, successive additional interrogations of the transponder are transmitted by the radar (at 1030 MHz), after the operational interrogations 57 and 58 of the transponder are performed at nominal power and as soon as the misalignment of the main Sum channel lobe of the antenna is sufficient for the power transmitted towards the transponder to be at a level close to the theoretical threshold 61 of sensitivity of the latter while being a little higher, a level +6 dB higher than the theoretical threshold 72 for example. These successive interrogations are arranged in time in such a way that the measurement frames the value of the theoretical threshold. The straight lines 72 embodies this theoretical threshold in FIG. 7.

When the corresponding misalignment, or starting misalignment, is reached, the radar performs a first interrogation 73 of the transponder to be tested and awaits the reply therefrom.

Therefore, if from this first interrogation 73, which occurs for a misalignment for which the power radiates to the transponder is +6 dB above the theoretical threshold 72, a reply is received, successive additional interrogations 74 are transmitted by the radar to the transponder to be measured, the signal level transmitted to the transponder decreasing on each interrogation because of the variation of the misalignment.

According to the invention, additional interrogations 74 are then transmitted until:
for a given interrogation 75, no reply reaches the radar; or
the misalignment of the main antenna lobe 32 reaches a value, considered as limit value, for which the aircraft Us about to leave the area covered by the main Sum channel lobe of the antenna, a misalignment of −3.5° typically for the type of antenna generally used. This limit is embodied by the line 71 in FIG. 7.

In the first case, the additional interrogations 74 are then stopped and the value of the average of the signal power transmitted to the transponder for the last interrogation 74 to which the transponder has replied and of that for which the transponder has not replied, is considered to correspond to the real sensitivity level of the transponder.

In the second case, the limit misalignment being reached with no interrogation 74 remaining without reply, the measurement is reiterated on the next antenna revolution, by switching, for example, the attenuation of 20 dB applied initially at the radar transmission level, to a higher attenuation, equal to 30 dB.

Conversely, if, from the first interrogation 73, no reply is received, the measurement is reiterated on the next revolution, by beginning the measurement operation with a greater power margin, a margin of +10 dB for example, that is to say by implementing an interrogation 73 for a smaller misalignment of the main Sum channel lobe 32 of the antenna, the operation being repeated revolution by revolution until a reply to the first interrogation 73 is received. The sensitivity is then determined as explained previously by determining the first interrogation without reply following this first interrogation followed by a reply.

It should be noted that the fact of having to raise the power margin to be able to obtain a first interrogation followed by a reply constitutes a fact symptomatic of a failing of sensitivity of the transponder and that it is necessary, for safety, to measure it accurately.

Therefore, knowing the misalignment of the antenna lobe relative to the transponder, the misalignment measured for the last interrogation having received a reply from the transponder, the sensitivity $S_{Tr}$ of the transponder (at 1030 MHz) measured at the antenna of the aircraft can be expressed by the following relationship (relationship similar to the relationship [01] expressing the value of the power of the transponder):

$$S_{Tr} = \qquad [02]$$
$$= P_{Radar} - L_{Lobe\,azim} - L_{Lobe\,elev} + G_{Radar} - L_{Radar} -$$
$$(L_{Atm} + L_{lobe\,Tr} + R + f(\text{fréquence}))$$

in which:
$P_{Radar}$, represents the power (in dBm) of the interrogation signal effectively generated by the transmitter of the radar;
$L_{Lobe\,azim}$, represents the variation (in dB) of gain in azimuth of the radar antenna;
$L_{Lobe\,elev}$, represents the variation (in dB) of gain in elevation of the radar antenna;
$G_{Radar}$, represents the maximum gain (in dB) of the radar antenna in transmission;
$L_{Radar}$, represents the losses (in dB) between the radar transmitter and its antenna;
$L_{Atm}$, represents the atmospheric losses (in dB):
$L_{Lobe\,tr}$, represents the variation (in dB) of gain in elevation of the transponder antenna;
R, represents the propagation losses (in dB);
f(fréquence), represents a constant that is a function of the 1030 MHz frequency.

It should be noted here that to be able to amply use the back part of the main Sum channel lobe of the antenna, between −2° and −3.5°, it is necessary, as FIG. 7 illustrates, to disable the action of the ISLS function and very significantly reduce the action threshold of the RSLS function.

To modify the signal level transmitted to the transponder dynamically, a third solution consists in transmitting radar interrogations by the Difference channel of the antenna and not by the Sum channel so as to use the slope of the difference pattern 35, usually used in reception (at the 1090 MHz frequency) for the monopulse off-boresight angle function. The use of the difference channel advantageously makes it possible to transmit the selective interrogations whose amplitude varies this time by increasing progressively as a function of the misalignment of the target in the antenna lobe from FIG. 1.

Figure 8:
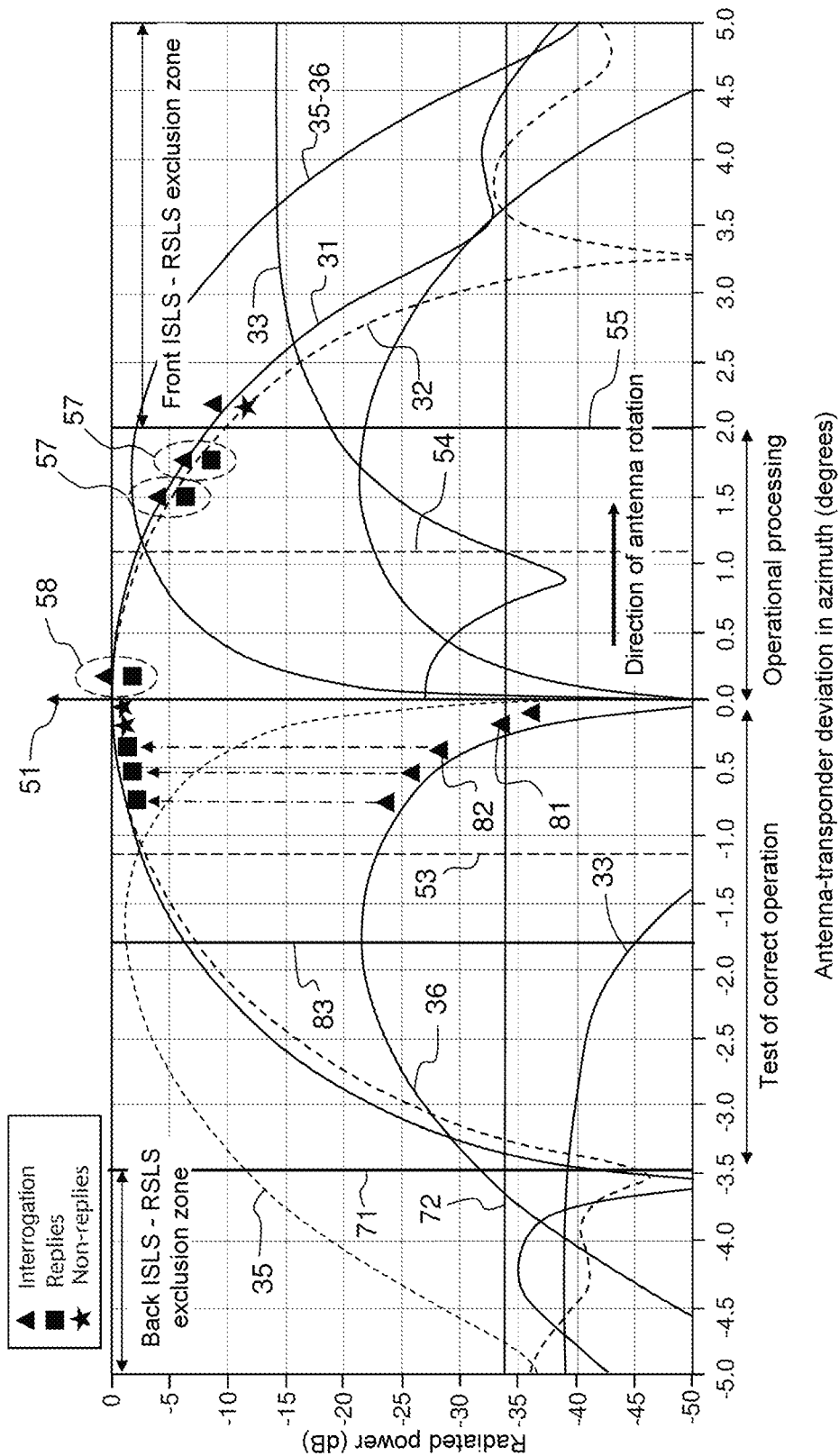
FIG. 8, a diagram illustrating the principle of sequencing of the operational interrogations in Mode S and of the additional interrogations in the context of the sensitivity measurement step of the method according to the invention, in a second implementation.

According to this third solution, illustrated by FIG. 8, the radar transmits, to the transponder concerned, the pattern 36b of the Difference channel of the antenna (transmission DIFF channel), successive additional selective interrogations 81-82. This operation is performed as soon as the operational interrogations 57 and 58 of the transponder by the radar are performed.

The variation of level of these interrogations, making it possible to frame the theoretical sensitivity threshold 72 of the transponder, is obtained by using the variation of the misalignment of the antenna lobe relative to the azimuth of the transponder and the strong variation of gain of the pattern of the difference channel for low misalignment values.

This strong variation of gain makes it possible, for example, to perform additional interrogations 81, 82 for which the power transmitted to the transponder can vary so as to frame the theoretical threshold 72 within a range of the order of ±10 dB for example, as FIG. 8 illustrates, this transmitted power range corresponding to a given misalignment range.

According to the invention, successive additional interrogations 81-82 of the transponder are transmitted by the radar via DIFF channel (curve 36) at 1030 MHz, with power attenuated if necessary, according to the distance from the aircraft, after the operational interrogations 57 and 58 of the transponder have been performed at the nominal power and as soon as the misalignment of the main Sum channel lobe of the antenna is sufficient for the power transmitted via the DIFF channel lobe 36 towards the transponder to be at a level close to the theoretical sensitivity threshold 72 of the latter while being a little below, a level 10 dB below the theoretical threshold 72 for example. The successive interrogations 81-82 are arranged in time in such a way that the measurement frames the theoretical threshold value.

When the corresponding misalignment, or starting misalignment, is reached, the radar performs a first interrogation into one of the transponder to be tested and awaits the reply therefrom. From the first reply from the transponder, the additional interrogations 81 are then stopped and the value of the average, between the signal power transmitted to the transponder for the first interrogation 82 to which the transponder has replied and the last interrogation 81 to which the transponder has not replied, is considered to correspond to the real sensitivity level of the transponder.

Therefore, if from the first interrogation 81, with a power level transmitted to the transponder 10 dB below the theoretical sensitivity threshold 72, the radar receives replies from the transponder, the measurement is reiterated on the next antenna revolution, by transmitting the first interrogation 81 for a misalignment corresponding to a lower transmitted power level, a level 15 dB below the theoretical sensitivity threshold, for example.

The fact of having to raise, from 10 dB to 15 dB for example, the power margin around the theoretical threshold 72, constitutes a fact that is symptomatic of the strong sensitivity of the interrogated transponder, the transponder then being able to be considered to be too sensitive and therefore defective.

If, on the other hand, the transponder does not reply to any of the interrogations 81-82 transmitted within a given power range, a range of ±10 dB around the theoretical sensitivity threshold 72 the interrogations are continued with an increasingly higher level, in other words with an increasing greater misalignment, but while being limited to a misalignment corresponding to the maximum gain of the Difference channel pattern of the antenna, a misalignment embodied by the straight line 83 in FIG. 8 (a misalignment of −1.8° typically for a secondary radar antenna).

Therefore, if no reply is transmitted by the transponder for this transmitter power level, the measurement is reiterated on the next antenna revolution, by increasing the power transmitted by the radar, by switching, for example, from the attenuation of 20 dB applied at the radar transmission level, to an attenuation of 10 dB.

The fact of having to raise the transmitted power to be able to obtain a first interrogation followed by a reply, constitutes a fact that is symptomatic of a possible failure of the transponder.

It should be noted here that, to be able to exploit this part of the lobe to perform transactions with the transponder concerned, it is necessary to disable the action of the ISLS function and very significantly reduce the action threshold of the RSLS function, within the area of the pattern where the interrogations 81-82 are performed (attenuation of the power transmitted on the CONT channel).

The invention also proposes combining the second and third solutions during the same antenna revolution to more rapidly measure the sensitivity.

The third step 13 performs the testing of the maximum rate of reply of a transponder. It is recalled here that the maximum rate of reply values expected for a Mode S transponder are dictated by the ICAO standards.

These values differ according to the duration of the test performed and the category to which the transponder belongs.

As of now, these prescribed values are summarised in the table below.

| Interval (ms) | Short Mode S replies | Long Mode S replies | |
|---|---|---|---|
| | | Level 2, 3 or 4 transponder | Level 5 transponder |
| 25 | 8 | 4 | 6 |
| 100 | 18 | 6 in 18 | 9 in 18 |

Thus, to measure the maximum rate of reply in Mode S of a transponder, the type of surveillance task performed by the interrogating radar and the characteristics of the transponder (that it declares during the operational phase) should be taken into account.

The table below gives typical values of radar parameters that make it possible to determine, for a given radar, the appropriate measurement conditions.

| Radar configuration | Antenna period (sec) | Duration (ms) of the monopulse lobe (2.4°) | Duration (ms) of the maximum lobe (7°) |
|---|---|---|---|
| Airport | 4 | 26.6 | 77.8 |
| Surveillance | 6 | 40 | 116.6 |
| En-Route | 10 | 66 | 194.4 |

Thus, depending on the duration of illumination in the radar configuration considered (i.e. with a given antenna rotation speed and some lobe extension), it will be possible to check the requirement on a time basis of 25 ms only or of 25 ms or 100 ms by choice.

Figure 9:
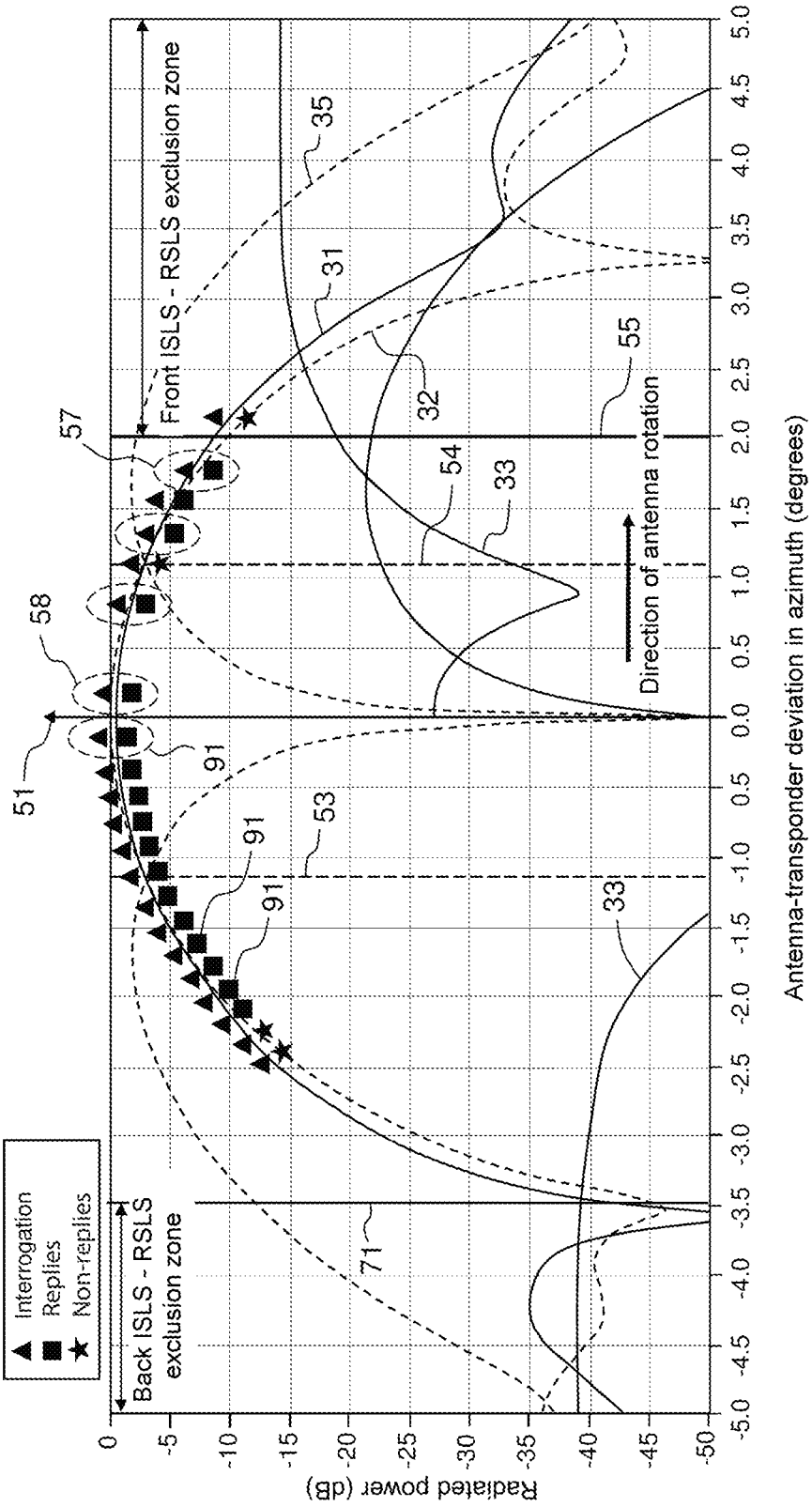
FIG. 9, a diagram illustrating the principle of sequencing of the operational interrogations in Mode S and of the additional interrogations in the context of the step of measurement of the maximum rate of reply of the method according to the invention.

As FIG. 9 illustrates, to perform this step of the method according to the invention, the radar transmits, for a short time interval of given duration, typically less than 100 ms, successive interrogations to the transponder concerned. These additional interrogations 91 begin as soon as the last operational selective interrogation 58 has been executed successively for the configuration concerned.

The additional interrogations 91 transmitted which give rise to a reply from the transponder are counted and determine the maximum rate of reply.

Therefore, this rate is used to determine whether the transponder concerned meets imposed criteria.

According to the invention, the number of additional of selected interrogations 91 to be transmitted to the transponder per "Roll Call" period is determined by taking into account:

the number of Roll Calls that are feasible within the time available, 25 ms or 100 ms, the objective of the measurement, this objective being able to be:

to check that the limit prescribed by the ICAO, to check that the limit prescribed by the ICAO is upheld, to search for the maximum number of replies that the transponder can produce within the time allotted to the test.

It should be noted here that, to make it possible to have a time interval that is sufficient to place the number of additional interrogations required to perform the desired test, it is necessary to be able to use the main Sum channel lobe of the antenna beyond the area normally used for the operational interrogations. For that, it is necessary, in the interrogations 91, to disable the action of ISLS function and to dynamically and very significantly reduce the action threshold of the RSLS function at the level of the back lobes of the pattern 34.

As can be observed from the preceding description, the test method according to the invention imposes only little operating constraint on the radar in which it is implemented. However, because, in particular, of the number of additional interrogations that it involves, and of the modifications of the operation in real time that it may require (modification of the transmitted power, disabling of the ISLS function and desensitisation of the RSLS function), it is intended to be implemented when the operational conditions are favourable carrying out the test on a given aircraft.

Thus, given the additional transactions that can be generated in the test phase by the radar, the aircraft whose transponder is being tested will have to move within an area of the space that does not have any particular environmental constraint. In particular, the measurement of the rate of reply of the transponder which requires the transmission of additional interrogations which generate as many replies on the part of the transponder will preferentially be implemented while the aircraft concerned is moving in a particular area:

not located in a sector whose coverage is shared with other radars, not situated at the boundary of separation of the radar with other aircraft, located in a sector where the number of aircraft managed by the radar concerned is relatively low, priority being given on each revolution to the operational detection of the targets.

For its implementation, the method according to the invention advantageously requires only a few functional arrangements of the interrogating secondary radar. These arrangements, illustrated by FIG. 10, consist essentially in the addition of additional transaction management tasks, in other words tasks for preparing and executing interrogations at appropriate incidents, not used to execute the line operation tasks, and tasks of receiving and processing replies to these interrogations, transmitted by the interrogated transponder. As described previously, these additional transactions more particularly affect the tasks 12 and 13 of the method according to the invention.

Figure 10:
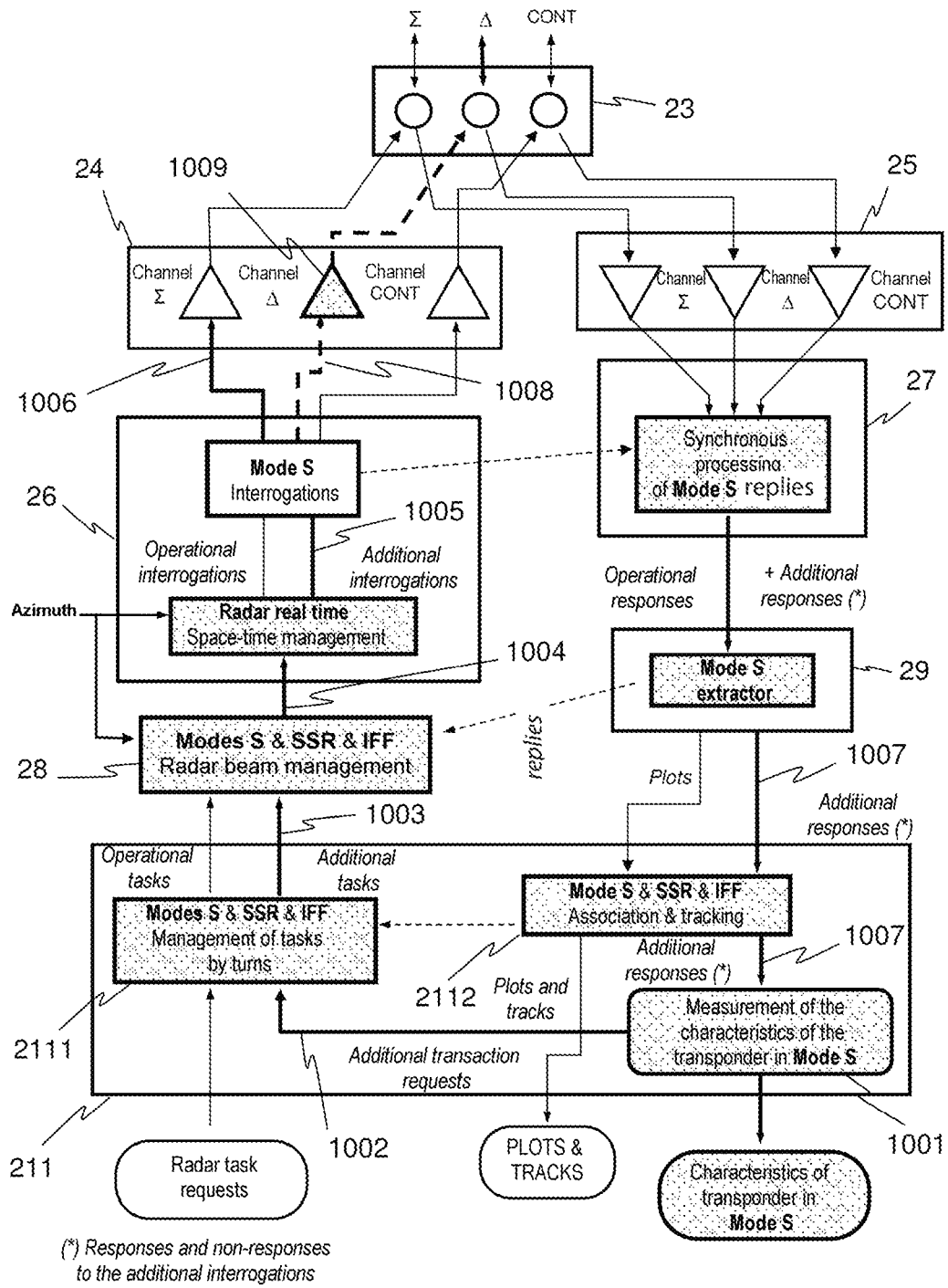
FIG. 10, a schematic diagram showing the functional modifications that allow a secondary radar to implement the method according to the invention.

In practice, as FIG. 10 illustrates, the different operations necessary to the execution of these particular transactions are within the management software controlling the different subassemblies of the radar involved in the radar-transponder exchangers.

Thus, the module 211 responsible for overall management of the radar information (reception 2111 of radar requests and generation of the tracking 2112) can be modified to take over the overall the management 1001 of the execution of the tests to be implemented on the transponders of the aircraft present in the area covered by the radar namely the tests of sensitivity (step 12 of the method), of transmission power (operation 111), of local average rate of reply (operation 112) and of maximum rate of reply (step 13 of the method).

Similarly, the radar beam management module 28 can be modified to an operation responsible for taking into account requests 1003 for additional transactions transmitted by the module 211, and for transmitting to the real-time management module 26, in good time, a transaction (interrogation, reply), Roll Call period after Roll Call period in the antenna lobe, in several additional selective interrogations for the same aircraft distributed within one and the same Roll Call period, a control message 1004 incorporating the commands for execution of additional interrogations 1005.

The module 26 takes into account these commands and then transmits, to the Sum channel of the transmitter 24, messages 1006, or, to the DIFF channel, messages 1008, relating to operational interrogations or to test interrogations, as well as the operating parameters associated with the different interrogations.

Also similarly, the extractor module 29 can be modified to incorporate a function responsible for taking into account the possible replies to the additional interrogations transmitted by the radar and for separating the replies 1007 to the additional interrogations from the operational replies making it possible to form the radar plots. The operational replies and the replies 1007 to the additional interrogations are then taken into account by the global management task 1001.

Thus, except for the step of measurement of sensitivity of a transponder which requires, for one of its implementations illustrated by FIG. 8, a hardware modification allowing the radar to transmit its interrogations via the difference channel (Δ channel) 36, the other steps of the method according to the invention advantageously require no hardware adaptational modification.

It should be noted that FIG. 10 is a simplified illustration of the system illustrated by FIG. 2, it being understood that, in reality, the IFF and SSR functions are not represented for the purposes of clarity of the figure, their presence not being in question.

Since the object of the invention is to trace, as effectively as possible, the aircraft that include a failing transponder, the execution of the tests of the method according to the invention for a given aircraft is performed preferentially, with regard to the secondary radars located in airports in particular, when the aircraft for which the transponder is to be tested has just taken off and is still at a short or medium distance from the ATC concerned. In fact, the distance separating the aircraft from the radar is then sufficiently small, even if the transponder exhibits a low transmission power, for the transmitted signal to still be able to be detected and for the other tests to be able to be executed.

In this way, a failing transponder can be detected and, in case of proven failure, measures can be taken, if necessary, by the traffic control system (ATC), in particular the absence of a second transponder rendering the flight of the aircraft potentially dangerous over long distances.

Moreover, to guarantee reliable measurements, the method is preferably implemented when the aircraft is in hovering flight, to avoid the pollution of the measurements by potential masking of the antenna of the transponder by the air foil of the aircraft in the movement thereof.

Furthermore, to achieve a sufficient level of accuracy and of reliability concerning the tests carried out, a level that is otherwise absolutely necessary to be able to qualify in a transponder as failure as a result of the measured values, the method according to the invention is repeated over several revolutions for one and the same aircraft. Furthermore, the method according to the invention is implemented to check the correct operation of the aircraft transponders located in azimuthal directions or the propagation of the waves between the radar and the aircraft concerned takes place in free space, so as to limit the disturbances linked to obstacles (buildings, reliefs, wind turbines, etc.) or to multiple reflection sources (roofs of buildings, icy mountain peaks, etc.).

It should be noted that, although the method according to the invention is intended to provide measurement information produced in a given secondary radar, the measurement data concerning the transponder of an aircraft can be exploited in the context of a global approach to monitoring the status and usage of the aircraft in service, or HUMS ("Health and Usage Monitoring System") approach.

Indeed, the measurements done at the level of a single radar, in the environmental conditions specific to the siting to which the latter is placed, can be transmitted to a global maintenance centre, using the existing communication networks between the radars and the ATC control centres, in order to be consolidated at the level multiple sensors over a long analysis period making it possible to track the trend over time of the operation of the aircraft equipment in service. The merging of the data from different radars advantageously makes it possible to have more measurements and therefore greater accuracy and above all reliability concerning the values of the parameters being monitored, by limiting the influence inherent to each radar site.

In particular, the operation 112 of the step 11, relating to the measurement of the local average rate of reply of a transponder, basically performed independently by different radars, can advantageously be enriched in multi-radar operation, by counting, per type unit, the average rate of reply of an aircraft over all of the interrogations transmitted by different radars interrogating this same aircraft during a given period, so as to establish a global average rate of reply of the transponder that is more accurate, more representative of the reality, which takes account of all the transactions in which it has taken part.

In such an organisation, each radar transmits, on each revolution (rendezvous), to a global traffic management centre for example, for each aircraft, a plot enriched with all the interrogations performed as well as the replies transmitted, or not, by the interrogated transponder, accurately data-stamped. This information can be merged by considering all of the radars managing this aircraft. Therefore, for each aircraft, the absence of reply to a selective interrogation is not taken into account for the calculation of the global average rate of reply if the latter corresponds temporarily to an instant for which the transponder of the aircraft concerned is in the process of replying to a selective interrogation transmitted by another radar. If such is the case, the transponder not being able to handle several interrogations simultaneously, it is simply declared busy.

In the context of the method according to the invention, this operation of taking into account an interrogated operation of the radar is performed by a complementary operation 113 consisting in taking into account the information relating to the transactions performed by the other radars in relation to the aircraft concerned and in temporally correlating these transactions to determine, if appropriate, the origin of an absence of reply to an interrogation. The absences of reply whose origin is linked to the execution by the transponder of a transaction with another radar not in this case being counted as such and the global average rate of reply is established on the basis of the presence or not of the replies to the other interrogations.

The measurement operations implemented in the context of the method according to the invention thus advantageously make it possible to perform a monitoring of the correct operation of the transponder of an aircraft by a control radar, an ATC radar for example, even while the latter is performing the operational tracking of the aircraft concerned. It is thus no longer necessary to perform the dismantling of the transponder and the testing thereof in a maintenance workshop to check its correct operation, that is to say its conformity to the specifications of the controlling international civil aviation authority. This checking can be done at any time when the aircraft is located within the control area of the radar.

Moreover, depending on the time available to the radar, the method according to the invention can be executed just once, the results of each of the measurements being analysed as soon as the execution of the corresponding test ends. However, alternatively, if the operational workload permits, the different steps of the method according to the invention can be repeated several times. The results obtained, for each type of measurement, can then be used jointly to calculate an average value, weighted by the number of samples used for each measurement, and the conditions for obtaining the latter.

Similarly, the method according to the invention can be executed by different radars for the same aircraft. The measurements performed for each radar can then advantageously be transmitted to a centralised traffic control management system which can perform the smoothing of the measurement results obtained. Such a smoothing makes it possible to improve the reliability and the accuracy of measurement of a given characteristic of the transponder by calculating an average of the corresponding measurements performed by each radar, measurements weighted by the number of samples used for each radar and by the conditions for obtaining the measurement concerned by each radar.

Also, because the operations executed do not require intervention in the transponder concerned, they can advantageously be executed regularly and the results obtained can be saved. The analysis of the trend of the results of these measurements over a long time make it possible, if necessary, to observe a gradual degradation of the performance levels of the transponder and to schedule, if necessary, maintenance actions on the transponder before the latter becomes non-operational.

The invention claimed is:

1. A method for performing the testing of the correct operation of the secondary radar transponder of an aircraft moving in an area covered by a secondary air traffic surveillance radar, wherein it comprises:

a first step which implements:

an operation of measurement of the power transmitted by the transponder, from the measurement of the power received from the transponder in reply to each interrogation transmitted by the radar;

an operation of measurement of the local average rate of reply of the transponder to the interrogations transmitted by the radar, performed by counting the number of interrogations for which the radar has received a reply originating from the transponder;

the first step being performed while the operating parameters of the radar are not modified relative to the line operation parameters;

a second step which implements an operation of measurement of the sensitivity of the transponder, performed by transmitting additional interrogations with transmission power levels increasing or decreasing over time, and by determining the transmitted power level in the transmission of the first interrogation below which the transponder does not transmit a reply;

the second step being performed by modifying the operating parameters of the radar so that the additional interrogations required for the measurement can be performed, during the time interval following the last operational interrogation during which the aircraft remains located in the main Sum channel lobe of the antenna of the radar, with a transmitted power in the direction of the transponder framing the sensitivity threshold of the transponder;

a third step which implements an operation of measurement of the maximum rate of reply that the transponder can sustain during a short time interval of given duration, the operation being performed by transmitting a plurality of additional interrogations and by counting the interrogations for which the transponder has transmitted replies;

the third step being performed by modifying the operating parameters of the radar so as to make it possible to transmit, during the time interval following the last operational interrogation during which the aircraft remains located within the main Sum channel lobe of the antenna of the radar, a number of successive interrogations that is sufficient to cause an absence of reply from the transponder.

2. The method according to claim 1, wherein the power measurement operation of the first step is performed from the operational interrogations or additional interrogations transmitted to the transponder.

3. The method according to claim 1, wherein the operation of measurement of the local average rate of reply of the transponder of the first step is carried out by performing, for each antenna revolution, the detailed accounting of the ratio between the number of interrogations sent to the transponder and the number of replies obtained in the effective EBW lobe, and by calculating, in a sliding manner, the average value of this ratio over a given number of antenna revolutions or antenna rendezvous.

4. The method according to claim 3, wherein in a multi-radar operating configuration, the execution of the operation of measurement of the local average rate of reply of the transponder of the first step involves a complementary operation that makes it possible to determine whether, in the case of an absence of reply to the interrogations transmitted by the radar during a given time interval, the interrogated aircraft is busy with the transmission of a reply to another radar also belonging to the multi-radar considered, the absences of reply considered not in this case being counted as such and the overall average rate of reply is established on the basis of the presence or not of reply to interrogations transmitted by other radars.

5. The method according to claim 1, wherein the sensitivity measurement operation of the second step is performed by progressively reducing the power transmitted to the transponder, additional interrogations being transmitted by the radar as soon as the power transmitted to the transponder passes below a given power value greater than the theoretical sensitivity threshold and within a power interval including this threshold; the successive additional interrogations being transmitted, while the power transmitted to the transponder decreases until no further reply is transmitted to the radar, the value of the average, between the power of the signal transmitted to the transponder for the last interrogation to which the transponder has replied and that for which the transponder has not replied, determining the measured sensitivity level of the transponder.

6. The method according to claim 5, wherein the transmission power of the transmitter of the radar being reduced by a given number of dB additional interrogations are transmitted by the radar with decreasing power levels as soon as, because of the misalignment of the main Sum channel transmission lobe relative to the direction of the aircraft, the power transmitted to the transponder evolves within a power interval including the theoretical sensitivity threshold of the transponder.

7. The method according to claim 5, wherein if, from the first additional interrogation, the transponder does not supply a reply or if, upon the last additional interrogation, the transponder still transmits a reply, the sensitivity measurement step is re-executed on the next antenna revolution with a power transmitted by the transmitter respectively greater than or less than the power transmitted for the preceding measurement.

8. The method according to claim 1, wherein the transmitter being configured to transmit a signal to the transponder via the Difference channel transmission lobes with a given power, additional interrogations are transmitted by the radar as soon as, because of the misalignment of the Difference channel transmission lobes relative to the direction of the aircraft, the power transmitted to the transponder passes below a given power value lower than the theoretical sensitivity threshold and increases within a power interval including this theoretical threshold, the successive additional interrogations being transmitted, while the power transmitted to the transponder increases, until a reply is transmitted to the radar, the value of the average, between the power of the signal transmitted to the transponder for the first interrogation to which the transponder has replied and the last for which the transponder has not replied, is considered to correspond to the measure sensitivity level of the transponder.

9. The method according to claim 8, wherein if, while the value of the power transmitted to the transponder is greater than the upper limit of the power interval considered the transponder still does not transmit any reply, or if the transponder supplies a reply from the first interrogation, the sensitivity measurement step is re-executed on the next antenna revolution with a power transmitted by the transmitter respectively greater than or less than the power transmitted for the measurement.

10. The method according to claim 1, wherein the operation of measurement of maximum rate of reply of a transponder is performed by transmitting, to the transponder concerned, as soon as the operational selective interrogation has been successfully executed, successive additional interrogations, separated from one another by a time interval consistent with the time unit of the maximum rate of reply to be measured, and by counting the replies transmitted by the transponder up to the first interrogation remaining without reply, and by determining the maximum reply time, so as to establish a measurement of the maximum rate for a given time unit, said rate being compared to the minimum rate imposed by the applicable regulation to determine the state of the transponder.

11. The method according to claim 1, wherein the different steps are executed several times during the flight of the aircraft, on each antenna revolution, the results obtained for each measurement being used to calculate an average of the value of the weighted measured characteristic of the number of samples of each measurement and of the conditions of obtaining said measurement.

12. The method according to claim 1, wherein the different steps are executed for one and the same aircraft by several radars, the measurements obtained by each of the radars being used to calculate an average of the value of the weighted measured characteristic of the number of samples of each measurement and of the conditions of obtaining said measurement.

* * * * *